United States Patent [19]
Gallagher et al.

[11] Patent Number: 5,809,253
[45] Date of Patent: Sep. 15, 1998

[54] METHOD AND APPARATUS FOR INTERCONNECTING NETWORK DEVICES IN A NETWORKING HUB

[75] Inventors: Shawn Gallagher, Leominster; James Scott Hiscock, Harvard; Dahai Ding, Leominster; Scott D'Edwine Lawrence, Concord, all of Mass.

[73] Assignee: Cabletron Systems, Inc., Rochester, N.H.

[21] Appl. No.: 888,999

[22] Filed: Jul. 7, 1997

Related U.S. Application Data

[63] Continuation of Ser. No. 268,058, Jun. 29, 1994, abandoned.

[51] Int. Cl.$^6$ ..................................................... G06F 13/00
[52] U.S. Cl. ...................... 395/200.58; 395/281; 395/284
[58] Field of Search ........................ 395/800.01, 200.3, 395/200.58, 281, 282, 283, 284, 500

[56] References Cited

U.S. PATENT DOCUMENTS

| | | | |
|---|---|---|---|
| 5,267,309 | 11/1993 | Sanders et al. | 379/399 |
| 5,293,486 | 3/1994 | Jordan et al. | 395/200.01 |
| 5,301,303 | 4/1994 | Abraham et al. | 395/500 |
| 5,388,099 | 2/1995 | Poole | 370/85.12 |
| 5,420,986 | 5/1995 | Baldwin et al. | 395/325 |
| 5,432,789 | 7/1995 | Armstrong et al. | 370/92 |
| 5,432,907 | 7/1995 | Picazo, Jr. et al. | 395/200 |
| 5,442,750 | 8/1995 | Harriman, Jr. et al. | 395/200 |
| 5,497,460 | 3/1996 | Bailey et al. | 395/183.13 |
| 5,517,623 | 5/1996 | Farrell et al. | 395/281 |
| 5,524,254 | 6/1996 | Morgan et al. | 395/800 |
| 5,561,771 | 10/1996 | Harriman, Jr. et al. | 395/200.13 |

*Primary Examiner*—Meng-Ai T. An
*Assistant Examiner*—Walter D. Davis, Jr.
*Attorney, Agent, or Firm*—Wolf, Greenfield & Sacks, P.C.

[57] ABSTRACT

A system for interconnecting line cards attached to a networking hub is disclosed. The disclosed system operates by forming backplane networks between the line cards using shared data path resources within the hub. Each line card attached with the hub describes its hub internal networking characteristics and capabilities. A hub management agent obtains the specific capabilities and characteristics of each line card attached to the networking hub, from each of the line cards. The characteristics and capabilities of each line card include which of the shared data path resources are accessible to the line card, and how the line card is able to operate on those accessible shared data path resources. The capabilities and characteristics of the line cards are obtained by the management agent requesting each line card for the information. The request is initiated by a triggering event, for example power-up of the networking hub or attachment of a new line card to the networking hub. The management agent obtains the characteristics and capabilities of the line cards attached to the networking hub, and then backplane networks are created in response to requests received from a network management station.

The disclosed invention relates generally to interconnection of communication systems, and more particularly to configuration and allocation of shared data path resources among line cards within a networking hub.

16 Claims, 11 Drawing Sheets

METHOD AND APPARATUS FOR INTERCONNECTING NETWORK DEVICES IN A NETWORKING HUB

This application is a continuation of application Ser. No. 08/268,058, filed Jun. 29, 1994 now abandoned.

BACKGROUND

Users of multiple computer systems are able to share data through the use of many types of communications systems. Such communications systems are known as "networks", examples of which include Local Area Networks (LANs), Wide Area Networks (WANs), and Metropolitan Area Networks (MANs). As the number of networks in each office building or manufacturing plant has increased, there has arisen a desire to interconnect multiple network devices at a central location. This central location is typically a "wiring closet". Networking hubs, or "hubs", are used in wiring closets to provide a central connection point for multiple network devices, such as bridges, routers, terminal servers, repeaters and probes.

Typically, a hub includes several attachment slots to hold line cards. Each line card contains one or more network devices attached to the hub. Internal data path resources within the hub are used to pass data between the multiple line cards. Each line card includes zero or more front panel connections, which are used to connect the line card to one or more external networks on which the line card operates. The external networks connected with the line card may be one of a variety of network types, such as Ethernet, Token Ring (IEEE 802.5), Fiber Distributed Data Interconnect, Asynchronous Transfer Mode, Wide Area Network Links, or proprietary buses.

A first disadvantage of existing hub designs is that the capabilities and characteristics of each type of line card must be stored a priori in a management agent for the hub. In such existing designs, when a line card is attached to the networking hub, the management agent reads the product ID, or "type" of the line card. Based on the type of the line card, the management agent determines how the line card can use the internal data path resources to pass data to other line cards attached to the hub. The management agent in such existing systems therefore requires a priori knowledge of what shared data path resources are accessible to all line card types, and the methods by which each line card type can use those accessible shared data path resources.

For reasons of economy, all line card types do not include circuitry to access all the shared data path resources in the hub. Similarly, new line card types will include circuitry to access only a subset of those shared data path resources accessible to previous line card types. In existing designs, the hub management agent must know what shared data path resources each new line card type can access, in order to pass information to and from the new line card, and in order to connect the new line card with other line cards attached to the networking hub. Therefore, in existing systems, whenever a new type of line card is developed, the management agent must be upgraded to include the necessary a priori information regarding the characteristics and capabilities of the new line card type. Upgrading is typically accomplished through loading of a new firmware image. Such procedures are time consuming, inconvenient and costly to the user of the networking hub.

Other existing systems dedicate specific shared data path resources within the hub for corresponding specific predetermined networking technologies. For example, such a system might have a first data path for a first communications protocol, and a second data path for a second communications protocol. When the capacity of the first data path was exhausted, no further line cards using the first communications protocol could be attached with the hub without physically installing a new shared data path, supporting the first communications protocol, into the hub. Without the physical upgrade the management agent in the networking hub cannot connect a new line card using the first communications protocol to other line cards attached to the networking hub. The requirement of a physical upgrade to accommodate a particular combination of line cards is inflexible and therefore undesirable.

Other examples of existing systems use dip switches on each line card to indicate how the line card is to communicate with the management agent within the hub. Such systems are not remotely manageable, often requiring that the line card be physically removed from the hub to modify the dip switch values. Physically removing a line card is undesirable, as it may require bringing power down on the hub, thus impacting the operation of other line cards installed in the hub.

There is therefore a need for a new system for interconnecting network devices, that efficiently supports multiple external network types, and is capable of supporting future generations of network line cards, where the new lines cards may have new capabilities and characteristics, without upgrade of the management agent in the networking hub or physical modification of the networking hub. The new system should support remote management of line cards installed in the hub, and satisfy requests to logically connect line cards installed in the networking hub without disturbing existing connections.

SUMMARY

In accordance with principles of the invention, there is provided a system for interconnecting line cards attached to a networking hub by forming backplane networks between the line cards using shared data path resources within the hub. Each line card attached with the hub is capable of describing its networking characteristics and capabilities. During operation, a hub management agent obtains the specific capabilities and characteristics of each one of the line cards attached to the networking hub, from each of the line cards. The characteristics and capabilities of each line card include which of the shared data path resources are accessible to the line card, and how the line card is able to operate on those accessible shared data path resources. The capabilities and characteristics of the line cards are obtained by the management agent requesting each line card for the information. The request is initiated by a triggering event, for example power-up of the networking hub or attachment of a new line card to the networking hub.

The hub management agent uses the obtained capabilities and characteristics of the line cards to create network segments, referred to as "backplane networks", on the shared data path resources. The backplane networks interconnect sets of line cards having access to a common set of hub internal data path resources, and further having a common networking capability on that common set of hub internal data path resources. The line cards within each backplane network then exchange data over the backplane networks. In an example embodiment, each line card attached to a backplane network within the hub communicates on that backplane network using the same networking protocol as used on an external network to which the line card is attached.

As described herein, the hub efficiently interconnects network devices attached to it without requiring that a management agent within the hub have a priori knowledge of the capabilities and characteristics of the line cards attached to the hub. Thus the hub is able to accommodate new types of line cards without necessitating an upgrade of the management agent within the hub. The management agent further includes a method for matching the least flexible connection requests with those lines within the shared data path resources which have the fewest other potential uses. New line cards may be installed in the hub with minimal or no modifications to the hub.

These and other features and advantages of the present invention will become apparent from a reading of the detailed description in conjunction with the attached drawings in which like reference numerals refer to like elements in the several views.

DETAILED DESCRIPTION

Figure 1:
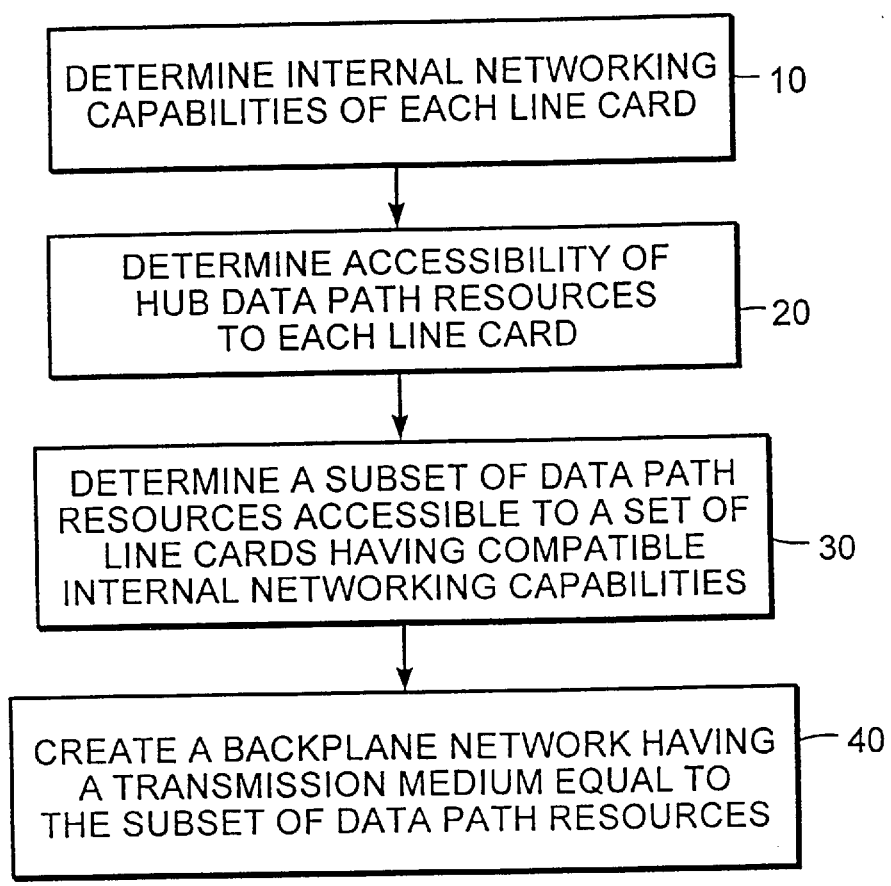
FIG. 1 is a flow chart showing the steps of a method for connecting line cards to data path resources in a networking hub.

FIG. 1 shows the steps in an example embodiment of a method for connecting line cards to data path resources in a networking hub. The steps of the method are performed by a hub management agent within the networking hub, in cooperation with management processes within line cards attached to the networking hub. The hub management agent may be implemented in a combination of hardware and software, within an embedded system in the networking hub itself, or within a separate hub management agent module attached to the hub.

The steps of the method shown in FIG. 1 are performed in response to a triggering event. Examples of triggering events are the addition of a new line card to the networking hub, or power-up of the networking hub.

In steps 10 and 20 of the method shown in FIG. 1, the management agent determines the characteristics and capabilities of the line cards attached to the networking hub. In an example embodiment of the method shown in FIG. 1, a request/response protocol is used in step 10 and step 20 as defined by the Simple Network Management Protocol (SNMP). The requests and responses are implemented using messages exchanged between the hub management agent and each line card over a low cost communications channel consisting of a serial communications line, for example twisted pair cable or other.

The SNMP protocol is described in many publications, one of which is "The Simple Book—An Introduction to Management of TCP/IP based Internets", by Marshall T. Rose, published by Prentice Hall, Englewood Cliffs, N.J., 1991, see particularly pages 133 through 162, all disclosures of which are herein included by reference. In the example embodiment using SNMP, a request message from the management agent to obtain the characteristics and capabilities of a line card is implemented as either a "get request" (GET-REQUEST) or "get next request" (GET-NEXT-REQUEST) message. The resulting response message generated by the line card is a "get response" (GET-RESPONSE) message. In an alternative example embodiment of the method shown in FIG. 1, a newly added line card reports its characteristics and capabilities without being requested to do so by the management agent. As a further alternative, Steps 10 and 20 may be implemented either by a system in which the hub management agent reads the internal network type code directly from one or more Control Status Registers (CSRs) on each line card.

In step 10 of FIG. 1, the hub management agent determines the internal networking capabilities of each line card attached to the networking hub. The internal networking capabilities of a line card describe how the line card is able to communicate on shared data path resources within the networking hub. The internal networking capabilities of a line card are maintained in a code or value, sometimes referred to as an "object", contained within the line card. A line card having internal networking capability including Ethernet is capable of using the Ethernet networking protocol to communicate with other line cards also having an internal networking capability including Ethernet, if the line card can access a set of shared data path resources also accessible to those other line cards.

In an example embodiment of step 20 of FIG. 1, the hub management agent determines the accessibility of hub data path resources to each line card. In step 20 of the example embodiment of FIG. 1, the management agent uses the request/response protocol to obtain one or more signal set codes from each line card. Each signal set code indicates a set of internal data path resources within the networking hub that are accessible to the line card, and also referred to as a "Channel". For example, in an embodiment in which the internal data path resources are a number of terminated etch lines, the signal set code is conveniently implemented as a string of bits equal in number to the number of terminated etch lines. Each bit in the signal set code indicates the accessibility of the corresponding line of terminated etch. The set bits in the signal set code indicate the terminated etch lines accessible to the line cards.

Following step 20 of FIG. 1, in step 30, the hub management agent, based on the information obtained regarding the line cards in steps 10 and 20, determines a subset of data path resources accessible to a set of line cards having a common internal networking capability. For example if line card 1, line card 2 and line card 3 have a common internal networking capability, and can all access a common subset of the data path resources within the networking hub, then the hub management agent stores a record of this relationship between line card 1, line card 2 and line card 3.

In step 40 of the method shown in FIG. 1, the hub management agent creates a backplane network having a transmission medium equal to the subset of data path resources determined in step 30. For example, where line card 1, line card 2 and line card 3 were found to be connected by a common subset of the internal data path resources within the networking hub, and have a common internal networking capability, for example Ethernet, in step 40 the hub management agent creates a backplane network of type Ethernet. The common subset of the internal data path resources is the transmission medium of the backplane network.

In the example embodiment of step 40 in FIG. 1, the hub management agent establishes the backplane network by telling the line cards that are to be connected with that backplane network which set of shared data path resources to connect to, as well as the type of the backplane network. The management agent establishes the backplane network by using an SNMP SET command to modify a database within each line card. The database within each line card is referred to as the "internal common" tables, or "ICom" tables within the line card. The modification of the ICom table indicates to the line card which of the shared data path resources it should use as a backplane network, and what the physical and data link layer protocol of the backplane network is. Subsequently, line card 1, line card 2 and line card 3 use the backplane network created in step 40 to transmit and receive data with each other and other network stations connected to the external connections of line card 1, line card 2, or line card 3.

Figure 2:
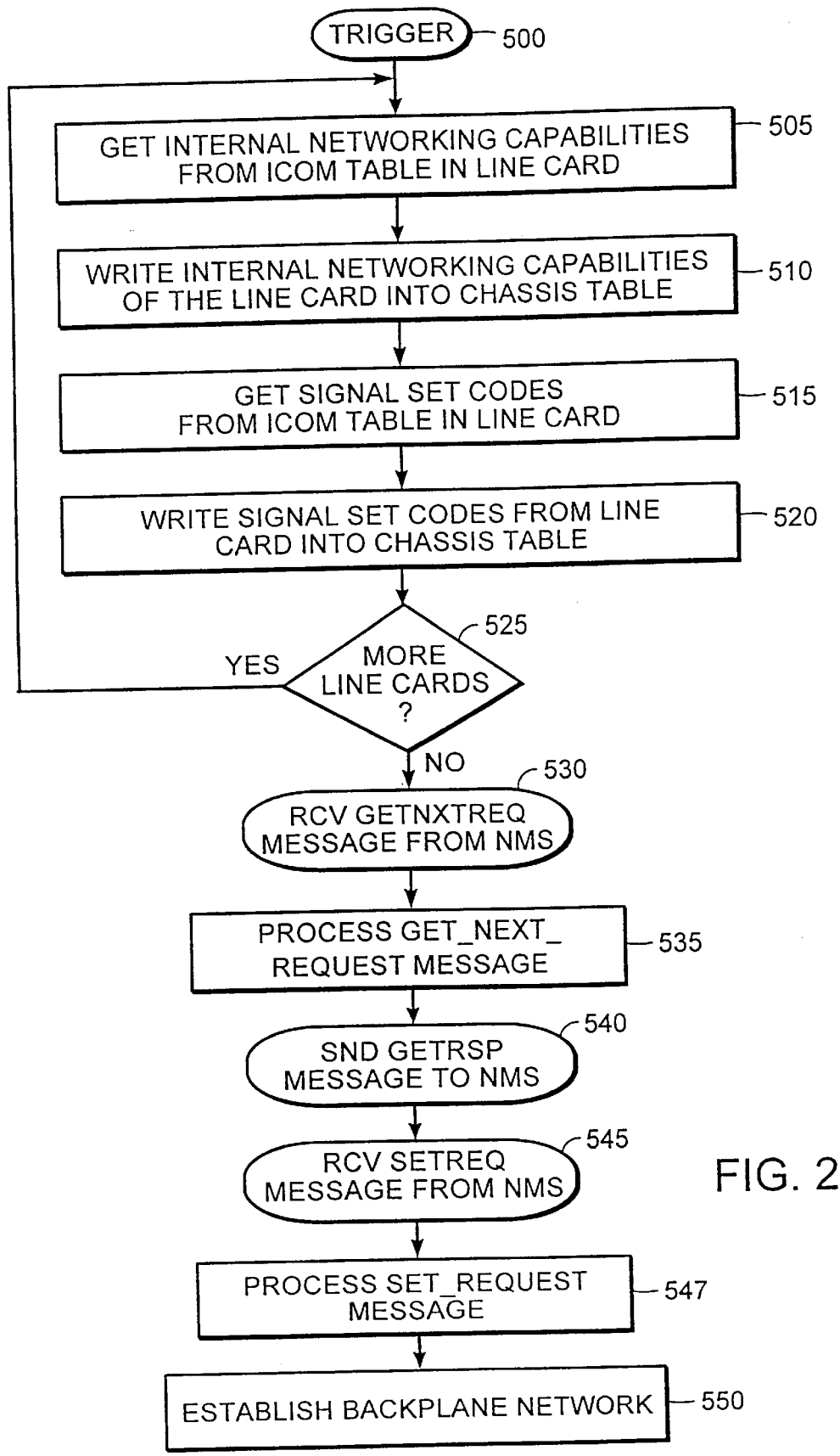
FIG. 2 is a flow chart showing steps of an example embodiment of a method for connecting line cards to data path resources in a networking hub.

In FIG. 2, the steps of a method for connecting line cards to data path resources of a networking hub are shown. The method of FIG. 2 is an example embodiment in which the steps of the method are performed in response to commands received by a hub management agent from a remote Network Management Station (NMS).

The method of FIG. 2 is performed responsive to a trigger condition 500. A first example of trigger condition 500 is a signal or interrupt generated when there is a power-up of the networking hub. A second example of trigger condition 500 is a signal or interrupt generated by user input for example setting of a reset switch. A third example of the trigger condition 500 is a signal or interrupt generated when a new line card is attached to the networking hub.

Subsequent to detection of the trigger condition 500, in step 505 the management agent obtains the internal networking capabilities from a first one of the line cards attached to the networking hub. The management agent obtains the internal networking capabilities from the line card by issuing one or more SNMP GET-NEXT-REQUEST messages to each line card, requesting the contents of a table stored in memory within the line card. The table within the line card is referred to herein as one of the Internal Common (ICom) tables existing within each line card. The line card responds by issuing one or more GET-RESPONSE messages to the management agent. The internal networking capabilities of the line card are described in a code or value contained in the GET-RESPONSE messages.

Following step 505, in step 510, the hub management agent writes the internal networking capabilities received from the line card into a table stored in a memory within the networking hub. The table is referred to herein as one of the Chassis Tables existing in the networking hub. In an embodiment in which the management agent is implemented within a management module separate from the networking hub itself, the Chassis Tables exist in a memory within the separate management agent module.

After step 510, in step 515, the hub management agent obtains the accessibility of hub data path resources to the line card. The management agent issues one or more SNMP GET-NEXT-REQUEST messages to the line card, requesting the line card to return the contents of one of the ICom tables within the line card. The line card responds with one or more GET-RESPONSE messages having as data the contents of the ICom table. In the example embodiment of FIG. 2, the accessibility of hub data path resources to a line card is reported using one or more Signal Set Codes.

In step 520, subsequent to step 515, the hub management agent stores the accessibility of the hub data path resources obtained in step 515 into a table in memory within the networking hub. The table is referred to herein as one of the Chassis Tables within the networking hub.

In step 525, subsequent to step 520, the hub management agent determines if it has obtained the characteristics and capabilities of all line cards attached to the networking hub. If not, the management agent repeats steps 505, 510, 515, and 520 for the remaining line cards. If the management agent has obtained the characteristics and capabilities of all line cards attached to the networking hub, then the management agent waits until it receives an instruction to create backplane networks to connect the line cards to networking hub data path resources. In an alternative embodiment to the example embodiment of FIG. 2, the management agent automatically creates backplane networks on the shared data path resources within the networking hub.

Steps 505, 510, 515, and 520 do not require strict ordering. The ordering of the steps 505, 510, 515 and 520 in FIG. 2 is given for purposes of example. Other ordering of these steps is possible, and will not effect the correctness of the system's operation.

Continuing with reference to the example embodiment of FIG. 2, in step 530, subsequent to step 525, the management agent receives a message from a Network Management Station. The message received by the management agent indicates that the management agent should return information to the Network Management Station regarding the characteristics and capabilities of the line cards attached to the hub.

In the example embodiment of FIG. 2, the management agent receives one or more SNMP GET-NEXT-REQUEST messages in step 530. The GET-NEXT-REQUEST messages request the management agent to return information contained in the Chassis Tables to the Network Management Station.

In step 535, the management agent processes the message received from the Network Management station in step 530. In the example embodiment, in step 535 of FIG. 2, the management agent processes the received GET-NEXT-REQUEST messages.

In step 535, the management agent processes the GET-NEXT-REQUEST messages received in step 530 by creating GET-RESPONSE messages containing the capabilities and characteristics of the line cards attached to the networking hub. The capabilities and characteristics of the line cards attached to the networking hub are read by the management agent from the Chassis Tables stored in the networking hub.

In step 540, subsequent to step 535, the management agent transmits the GET-RESPONSE messages created in step 535 to the Network Management Station which sent the GET-NEXT-REQUEST message received by the management agent in step 530.

In step 545, subsequent to step 540, the management agent receives a message from the Network Management Station indicating that the management agent should establish certain backplane networks on the shared data path resources of the hub to connect some number of the line cards connected to the hub. In the example embodiment of FIG. 2, in step 545 the management agent receives one or more SET-REQUEST messages from the Network Management Station. The SET-REQUEST messages received from the Network Management Station contain data to be written to the Chassis Tables within the networking hub.

Following step 545, in step 547, the management agent processes the messages received from the Network Management Station in step 545. The management agent processes the SET-REQUEST messages received in step 545 by writing information contained in the received SET-REQUEST messages into the Chassis Tables within the networking hub. In response to the resulting new values of the Chassis Tables, in step 550, the management agent creates backplane networks to connect line cards attached to the networking hub along shared data path resources within the networking hub.

Figure 3:
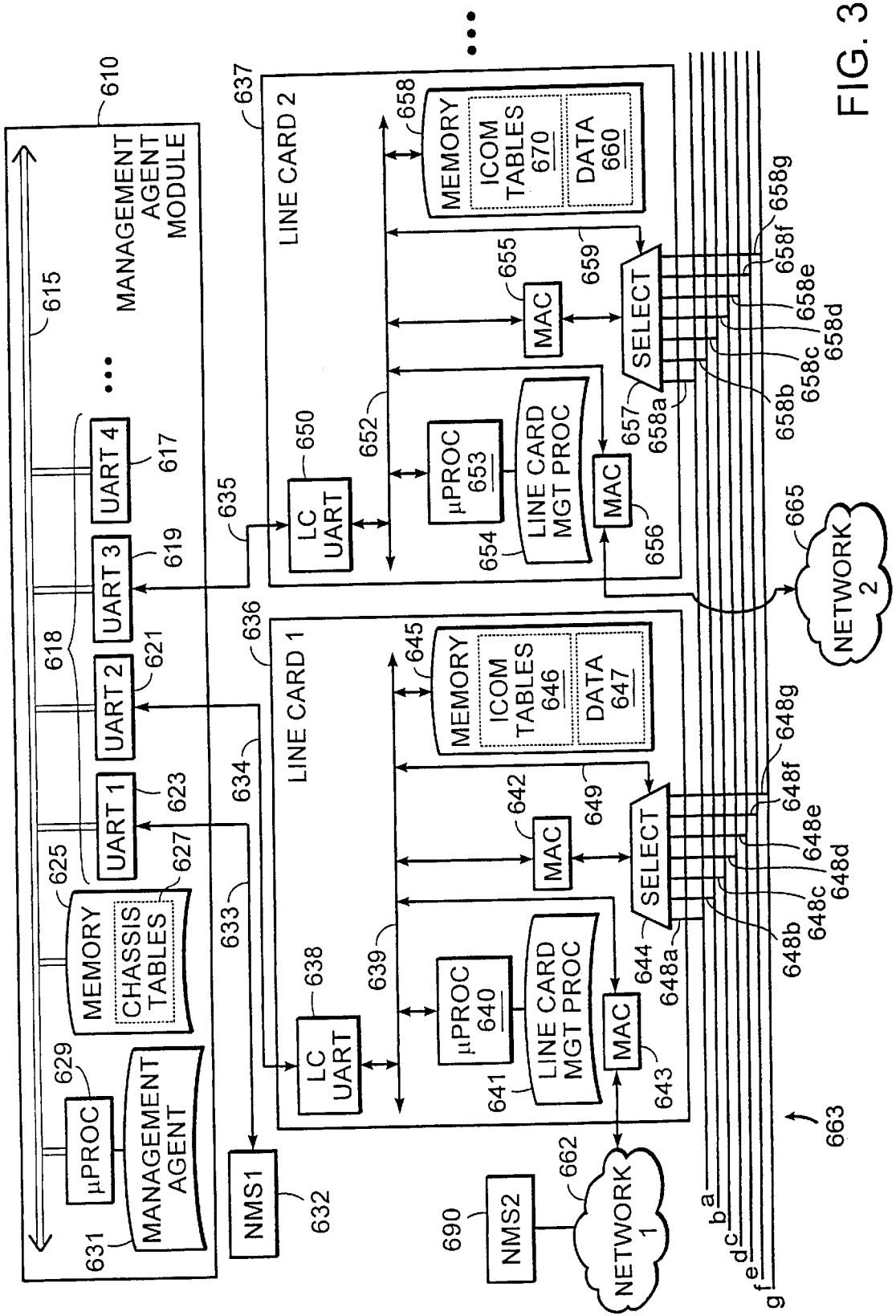
FIG. 3 shows an example embodiment of a networking hub for interconnecting multiple line cards.

FIG. 3 is a diagram showing an example embodiment of a networking hub for interconnecting multiple line cards. A hub management agent module 610 is shown having a hub management agent module bus 615, a microprocessor 629 coupled with the management agent module bus 615, a management agent memory 625 coupled with the management agent module bus 615, and several Universal Asynchronous Receiver-Transmitters (UARTs) 618, also coupled with the management agent module bus 615, for example UART1 623, UART2 621, UART3 619, and UART4 617. A hub management agent 631 is shown as a software process executing on the microprocessor 629. A set of Chassis Tables 627 are shown in the management agent module memory 625.

The hub management agent 631 accesses the contents of the management agent memory 625, as well as the UARTs 618 through the management agent module bus 615. Though the management agent 631 is shown in the example embodiment as a software process executing on the microprocessor 629, the hub management agent 631 is alternatively implemented using other technologies. For example, in an alternative example embodiment, the management agent is implemented as a process in an Application Specific Integrated Circuit (ASIC), coupled with the management agent module bus 615, in which case no microprocessor would be required.

In the example embodiment shown in FIG. 3, the management agent module 610 is shown implemented within a separate circuit card that is removable inserted in the networking hub. In an alternative example embodiment, the management agent module 610 is an integral part of the networking hub.

Further shown in the example embodiment of FIG. 3 are Network Management Station 1 (NMS1) 632, coupled with UART1 623, and Network Management Station 2 (NMS2) 690, coupled with a first network 662. NMS1 632 and NMS2 690 are network nodes, for example workstations, containing and executing network management software.

Also shown in the example embodiment of FIG. 3 are Line Card 1 636 and Line Card 2 637. Line Card 1 636 includes a line card UART 638, coupled with UART2 621 in the management agent module 610, and further coupled with a line card bus 639. Line Card 1 636 also includes a microprocessor 640 coupled with the line card bus 639, a memory 645 coupled with the line card bus 639, a first Media Access Control (MAC) ASIC 642 coupled with the line card bus 639 and also bidirectionally coupled with a select logic 644, and a second Media Access Control (MAC) ASIC 643 coupled with the line card bus 639 and the first network 662. The select logic 644 is further coupled via control lines 649 with the line card bus 639 and with a plurality of terminated etch lines 663a through 663g, through lines 648a through 648g. The terminated etch lines 663a through 663g are shared data path resources within the networking hub.

In an alternative embodiment, where the line card 1 636 and the line card 2 are physical layer devices such as Ethernet repeaters, MAC 642, MAC 643, MAC 655 and MAC 656 are not present.

The memory 645 contains Internal Common (ICom) tables 646. The ICom tables 646 contain information regarding the characteristics and capabilities of Line Card 1 636. For example, the ICom tables 646 contain information describing the internal networking capabilities of Line Card 1 636, and also information describing which of the terminated etch lines 663a through 663g are accessible to the Line Card 1.

Further with regard to Line Card 1 in the example embodiment of FIG. 3, the memory 645 contains data 647 for transmission onto a network. A line card management process 641 is shown as a software process executing on microprocessor 640. The control lines 649 control which one of terminated etch lines 663a through 663g are connected with the first Media Access Control ASIC 642. The select logic 644 is a multiplexor/demultiplexor, used to select a set of one or more of the terminated etch lines 663a through 663g for bidirectional coupling with the first MAC ASIC 642.

Line Card 2 637 in FIG. 3 includes a line card UART 650, coupled with UART3 619 in the management agent module 610, and also coupled with a line card bus 652. Line Card 2 637 further includes a microprocessor 653 coupled with the line card bus 652, a memory 658 coupled with the line card bus 652, a first Media Access Control (MAC) ASIC 655 coupled with the line card bus 652 and a select logic 657, and a second Media Access Control (MAC) ASIC 656 coupled with the line card bus 652 and a second network 665. The select logic 657 is coupled with the plurality of terminated etch lines 663a through 663g, through lines 658a through 658g. The terminated etch lines 663a through 663g are shared data path resources within the networking hub. The select logic 657 is a multiplexor/demultiplexor, used to select a set of one or more of the terminated etch lines 663a through 663g for bidirectional coupling with the first MAC ASIC 655.

Also in Line Card 2 637, the memory 658 contains ICom tables 670, which contain information regarding the characteristics and capabilities of Line Card 2 637. The memory 658 further contains data 660, for example data packets for transmission. A line card management process 654 is shown as a software process executing on microprocessor 653. Microprocessor 653 is further coupled with control input 659 of select logic 657. The control input 659 controls which one of terminated etch lines 663a through 663g are connected with the Media Access Control ASIC 656. Thus the select logic 657 is a multiplexor/demultiplexor, used to select a single one of terminated etch lines 663a through 663g for bidirectional coupling with the MAC ASIC 656.

In an alternative embodiment, the terminated etch lines 663a through 663g are each a set of lines. In the alternative embodiment, the select logic 657 is used to select one set of lines for connection to the line card. For example, each set of lines includes lines of various types, for example separate clock and data lines. In a second example, each set of lines includes one or more data lines.

During operation of the elements in FIG. 3, the hub management agent 631, in cooperation with the line card management process 641, determines the internal networking capabilities of the Line Card 1 636 by using UART2 621 to request information from the ICOM tables 646 in the memory 645 of the Line Card 1. The hub management agent 631 then writes the internal network type code of Line Card 1 636 into the chassis tables 627 in the management agent module memory 625. The internal network type code for Line Card 1 indicates the type of network control circuitry that is contained in Line Card 1 636. The internal network type code for Line Card 1 636 reflects the type of circuitry in MAC ASIC 642, and may indicate a network type different from the network type of the first network 662.

Further during operation of the elements in FIG. 3, the hub management agent 631 determines the accessibility of the internal data path resources consisting of terminated etch 663 to Line Card 1 636. In the example, the hub management agent 631 reads a signal set code from the ICOM tables 646, and writes the signal set code to the chassis tables 627. The signal set code indicates a set of the terminated etch lines 663 which are accessible to Line Card 1 636. For example, in this case the signal set code for Line Card 1 636 indicates that all of the terminated etch lines 663 are accessible to Line Card 1 636.

The hub management agent 631 then determines the internal networking capabilities and signal set code for Line Card 2 637 following the same steps as described above regarding Line Card 1 636. In this example, the internal network type for Line Card 2 637 is Ethernet, and the signal set code for Line Card 2 637 indicates that all of terminated etch lines 663 are accessible to Line Card 2 637.

Subsequently, the hub management agent 631 determines that Line Card 1 636 and Line Card 2 637 have compatible internal networking capabilities, and can also access a common set of the terminated etch lines 663. The hub management agent 631 then creates a backplane network of type equal to the internal network type codes of Line Card 1 636 and Line Card 2 637, in this example Ethernet, using an available subset of the terminated etch lines 663, for example etch line 663a. Thereafter, Line Card 1 636 and Line Card 2 637 are able to exchange data 647 and data 660 using MAC ASIC 642 and MAC ASIC 655 over terminated etch line 663a.

Figure 4:
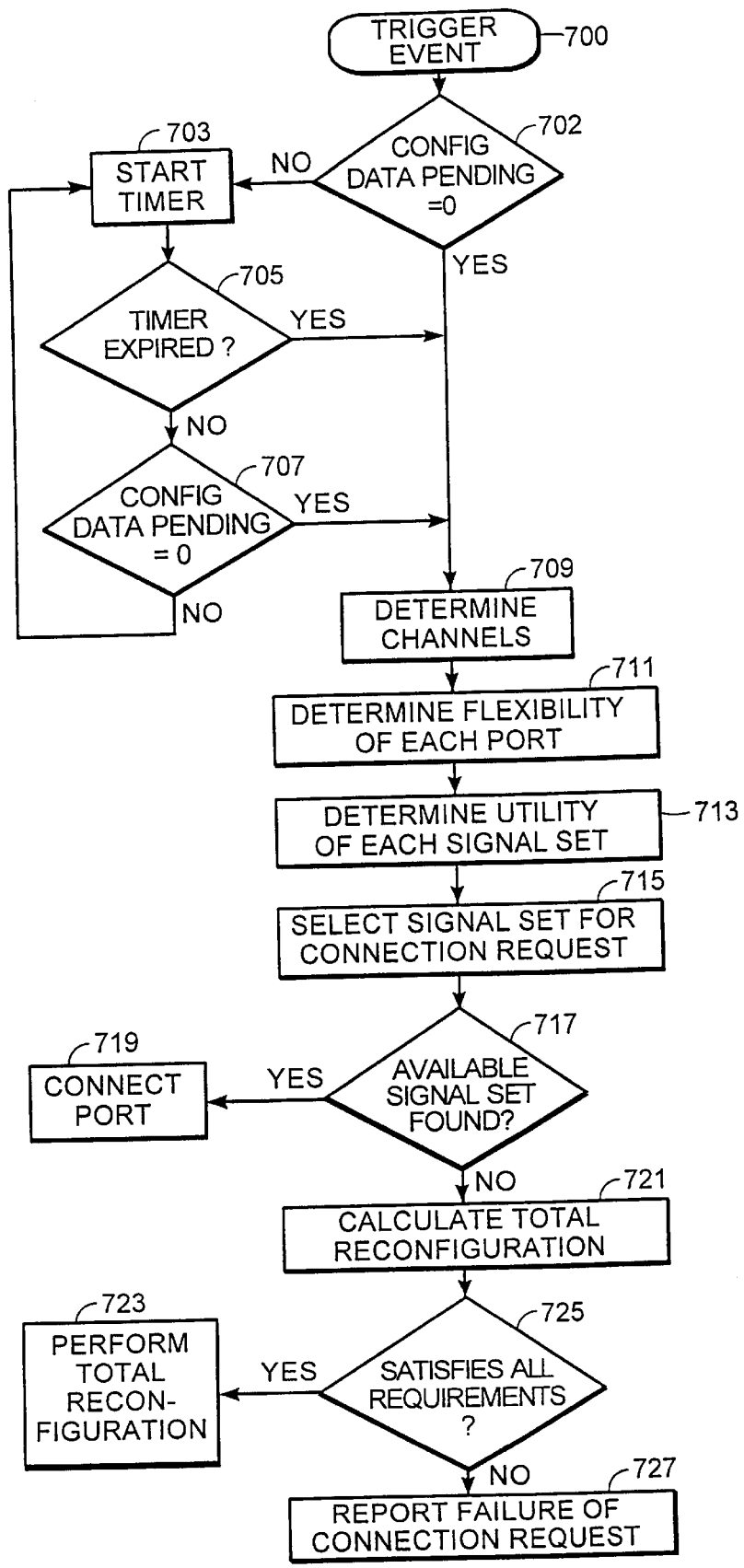
FIG. 4 shows the steps of an example embodiment of a method for allocating internal data path resources to line cards attached to a networking hub.

FIG. 4 shows the steps of an example embodiment of a method for allocating internal data path resources to line cards attached to a networking hub. The characteristics and capabilities of the line cards are obtained by the management agent via a request/response protocol in cooperation with a management process within each line card. The request/response protocol provides the contents of "Internal Common" (ICom) tables within the line cards to the management agent. The contents of the ICom tables in the line cards describes the characteristics and capabilities of each line card.

The management agent stores the information describing the characteristics and capabilities of the line cards in the "chassis tables" within the networking hub. A Network Management Station (NMS) accesses the chassis tables through a request/response protocol in cooperation with the management agent. The NMS then sets values in entries of the chassis tables within the networking hub, also using the request/response protocol. As a result of these actions, the management agent creates the backplane networks necessary to establish the configuration of connections between line cards requested by the NMS.

RECONFIGURATION TRIGGERS

The method of FIG. 4 is initiated upon detection of a trigger event 700 by the management agent. Examples of trigger events are:

1) A new connection or disconnection request from a Network Management Station (NMS). For example, the NMS may use the request/response protocol to set a value of an entry in one of the chassis tables within the hub. The new value of the entry indicates to the management agent that a new connection between line cards attached to the networking hub is requested.

2) A change in the configuration status of a line card attached to the networking hub. For example, a change in the available signal sets for the line card. This includes the 'change' that occurs when the line card first comes up after being initially attached to the networking hub.

DEFERRED RECONFIGURATION

Configuration of line cards into backplane networks by the management agent within the networking hub is based on the capabilities and characteristics of the line cards. The more complete the information available to the management agent regarding the capabilities and characteristics of the line cards, the better able the management agent is to create an optimal configuration of backplane networks. The management agent includes a set of semaphores that are incremented whenever a request for new information is sent from the management agent to a line card. The semaphores are decremented when the response from the line card is received. The management agent therefore includes a semaphore (configDataPending) that is incremented when there is a request outstanding to any line card, and one semaphore for each slot in which a line card may be attached to the networking hub (slotDataPending).

In step 702 of the method in FIG. 4, following detection of the trigger event 700, the management agent determines whether the configDataPending semaphore is equal to zero. An example trigger event is the receipt by the management agent of a request to create a connection between two or more of the line cards attached to the networking hub. If the configDataPending semaphore is non-zero, then the management agent defers the reconfiguration until the response for the outstanding request is received.

In the example embodiment shown in FIG. 4, following the determination that the configDataPending semaphore is non-zero in step 702, the management agent starts a timer in step 703. After step 703, in step 705, the management agent checks the timer to determine if it has expired. If the timer has expired, then the management agent continues on with step 709. If the timer has not expired, then the management agent continues with step 707.

In step 707 the management agent determines whether the configDataPending semaphore has become equal to zero, thus indicating that the outstanding request has been satisfied. If the configDataPending semaphore has become equal to zero, then the management agent continues with step 709. If the configDataPending semaphore is still non-zero, then the management agent goes back to step 705.

CHANNELS

The shared data path resources within the networking hub are referred to herein as a "backplane". The backplane consists of some number of lines or "signals", examples of which are data lines or clock lines. A group of backplane signals to which an interface of a line card is physically attached is referred to as a "signal set". A Channel is a signal set that exists in one or more line cards attached to the networking hub. For example, if two line cards both can access a common signal set, then the management agent recognizes the capabilities as being equal and maps the two line cards to one Channel. This mapping is dynamic— the management agent calculates it each time it learns a new signal set definition for a line card. Channel identifiers therefore vary from one restart to the next. During step 709 of the method shown in FIG. 4, the management agent determines the channels for line cards attached to the networking hub, based on the signal sets obtained from each line card through the request/response protocol in cooperation with a management process in each line card.

PORT FLEXIBILITY

A line card accesses the shared data path resources within the networking through an interface of that line card. An interface may operate through one or more signal sets. Each line card attached to the networking hub includes one or more interfaces. The Internal Common tables contained within each line card include a "BackPlane InterFace Table", referred to as IComBpIfTable. When a line card is powered up, the management process within the line card initializes the entries in the IComBpIfTable such that each entry describes one interface between that line card and the shared data path resources within the networking hub.

A logical connection of a line card to the networking hub over which a backplane network may operate, and as represented by the management agent to the NMS, is a "port". A port is established using one or more interfaces of the line card. Each line card may have multiple ports. The chassis tables include a "Chassis Port Table", referred to as chassisPortTable. The term "Chassis" is used to refer to the networking hub itself. The entries in the chassisPortTable describe "Port Objects". The chassisPortTable entries, like the contents of the other chassis tables, are visible external to the networking hub, and accessible to a Network Management Station (NMS).

The management agent is responsible for writing the chassisPortTable entries. The chassisPortTable entries describe the interfaces described in the icomBpIfTable within each line card. Specifically, a given entry in the chassisPortTable reflects the characteristics and capabilities of all interfaces for a Port on a line card.

Different line card interfaces have different capabilities and characteristics. For example, a first interface may be capable of using only a single backplane signal, while a second example interface is capable of being multiplexed to any of a number of signal sets. Thus some interfaces are more flexible than others with regard to how they are capable of using the shared data path resources within the networking hub.

During step 711 of the method shown in FIG. 4, following step 709, the management agent determines the flexibility of each port. The measure of flexibility of an individual interface within a port is its Interface Flexibility. For a given interface, the Interface Flexibility is the number of signal sets to which it can be connected. Each Port has a Port Flexibility, which is the numerically smallest Interface Flexibility of any of the interfaces present within that Port. During step 711 of FIG. 4, the management agent creates an entry for each Port for which a connection has been requested in a sequential list referred to as the PortsByFlexibility list in order of increasing Port Flexibility. Each entry within the PortsByFlexibility list identifies the line card which it represents, as well as the Port Flexibility of that line card.

SIGNAL SET UTILITY

Not all shared data path resources in the networking hub are of the same usefulness. For example, an embodiment may only have one line or "signal" available for Thinwire Ethernet connections. Further for purposes of example, certain shared data path resources in the networking hub may only reach certain of the slots in the networking hub. Those slots not reached by all the shared data path resources in the hub are consequently more difficult to connect with than those slots reached by all the shared data path resources within the hub.

The measure of this property of a signal within the data path resources of the hub is referred to as the SignalUtility of that signal. For each backplane signal, the SignalUtility is the number of Signal Sets of which it is a part. During step 713, following step 711, of the method shown in FIG. 4, the management agent determines a Utility for each Channel presently attached to the networking hub. The utility of a given Channel is the sum of the SignalUtility values of the signals in its signal set. Further in step, 713, the management agent places an entry into a ChannelsByUtility list for each Channel. Each entry in the ChannelsByUtility list includes indication of the Channel it represents, and the Utility of that Channel. The entries in the ChannelsByUtility list are entered and maintained by the management agent in order of increasing Utility. The utility metrics are recalculated and the ChannelsByUtility list resorted whenever new signal sets are read from a line card, or when existing signal sets are removed from a line card.

ALLOCATION OF SIGNAL SETS TO INTERFACES

Following the calculations of SignalSetUtility in step 713 and PortFlexibility in step 711, and after the ChannelsByUtility list and PortsByFlexibility list created and ordered, the selection of signal sets for each interface required to establish the requested connection is performed in step 715. The following substeps are performed by the management agent in step 715:

1) For each port on the PortsByFlexibility list (in order from least to most flexible), do a linear search of the ChannelsByUtility list, selecting the first (lowest utility) signal set that matches the requirements of the interfaces for the port.
2) If a match is found, then the port is moved to a list of pending connections.

In step 717 of the method shown in FIG. 4, the management agent determines if an available signal set was found for every port for which a new logical connection was required, for example by a request for a new connection as trigger event 700. If the management agent determines that a signal set is available to satisfy the new connection requests, then the port for which the new connection was requested is connected in step 719 to a backplane network on the available signal set selected by the management agent in step 715.

If the management agent determines in step 717 that no signal set is available to satisfy the connection request, then in step 721 the management agent calculates a total reconfiguration. Normally some backplane networks will already be in effect when a new connection request is made. If the management agent determines in step 717 that no signal set is available to satisfy the requested connection, then in step 721 the management agent completely recalculates all signal set utilities and port flexibilities as if starting from scratch, assuming that no existing connections or backplane networks may be broken and reconfigured if necessary to accommodate the new connection request.

Following step 721, in step 725 the management agent determines whether the results of the recalculation in step 721 indicate that a total reconfiguration can succeed in allocating signal sets sufficient to satisfy all existing and requested connections. The reconfiguration calculated in step 721 does not affect any existing connections unless the management agent determines in step 725 that all requested and existing connections can be satisfied by its implementation.

If the management agent determines in step 725 that a total reconfiguration can succeed in allocating signal sets to satisfy all existing and requested connections, then in step 723 the management agent performs a total reconfiguration. The total reconfiguration will generally require at least some existing connections to change to different signal sets. If the management agent determines in step 725 that a reconfiguration will not satisfy all requests, then the management agent reports in step 727 that the example connection request of trigger event 700 has not been satisfied. In the example method of FIG. 4, the management agent makes no attempt to weigh the value of requests which cannot be satisfied against those that can, and existing connections are not be broken unless they can be reconnected on a new signal set.

Figure 5:
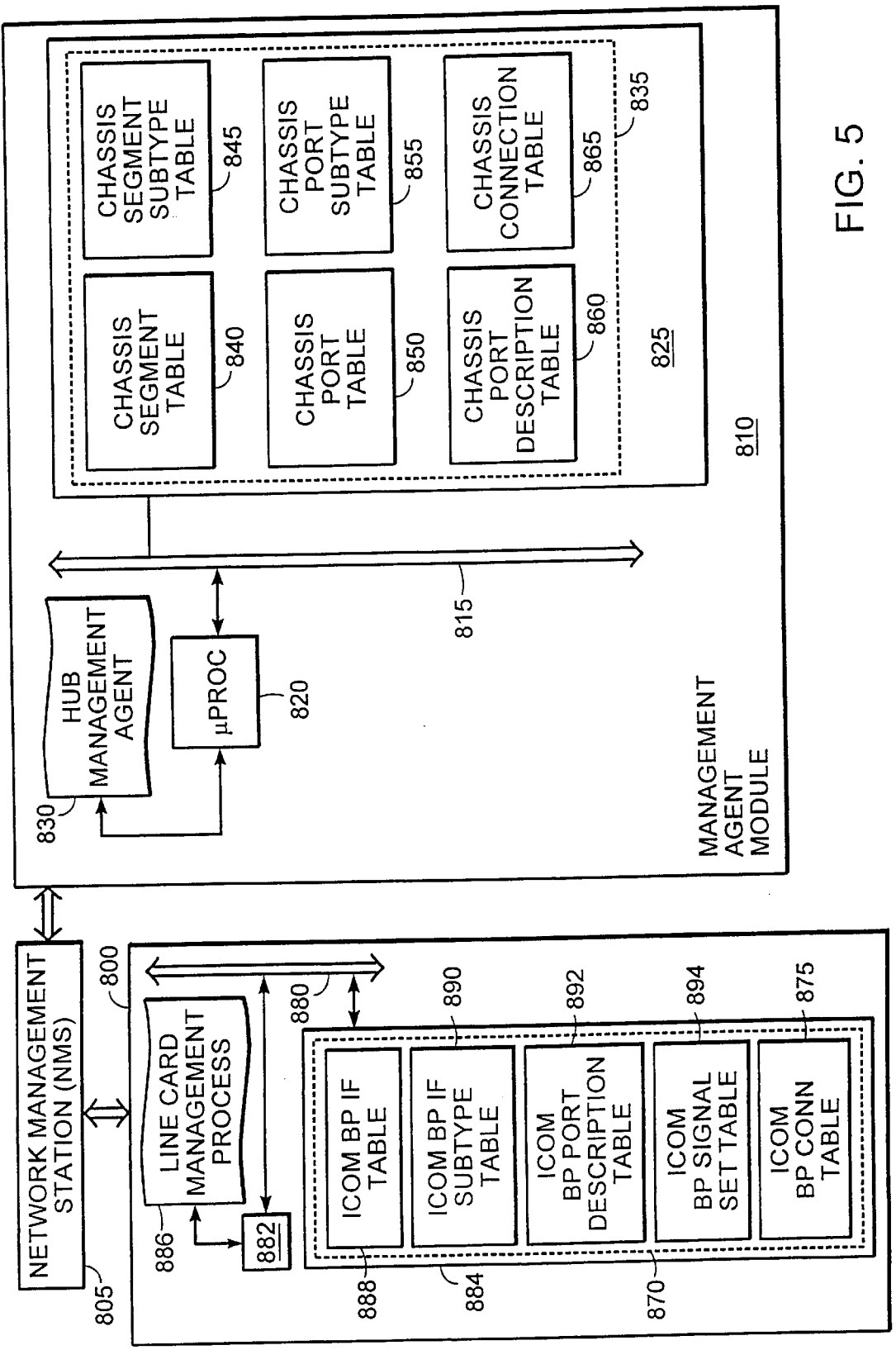
FIG. 5 shows the interconnection of elements within the networking hub, a line card, and a remote network management station.

FIG. 5 is a design diagram showing the interconnection of elements within an example embodiment of a networking hub, including a line card 800, and a network management station (NMS) 805 coupled with the management agent module 810. The management agent module 810 is shown having a management agent bus 815, a microprocessor 820 coupled with the management agent bus 815, a memory 825 coupled with the management agent bus 815, and a hub management agent 830, shown for purposes of example as a software process running on the microprocessor 820. Within the memory 825 are shown the chassis tables 835, including chassis segment table 840, chassis segment subtype table 845, chassis port table 850, chassis port subtype table 855, chassis port description table 860, and chassis connection table 865.

Chassis segment table 840 is a table containing information describing the backplane networks contained within the networking hub. Each entry within the chassis segment table 840 contains several subfields of information for a particular backplane network in the chassis. The subfields include a chassis segment index, a chassis segment name, a chassis segment type, chassis segment subtype selected, and chassis segment entry status. The chassis segment index is a unique index for the entry. The index field is used by the management agent to traverse the table in order of chassis segment index, and to find an entry corresponding to a specific index.

The chassis segment name is an administratively assigned name for the backplane network of the entry. The chassis segment type is a code representing the media type of the backplane network represented by the entry. The chassis subtype selected is the index in the chassis segment subtype table of an entry in the chassis segment subtype table describing further characteristics of the backplane network corresponding with the chassis segment table entry. In an example embodiment, the chassis segment entry status is the status of the entry within the table, not the state of the backplane network. Examples of status values for the entry status subfield are CREATED, DELETED, DISABLED, and UNDERCREATION.

The chassis segment subtype table 845 is a table containing entries, each entry within the table including additional information regarding one or more backplane networks. For example, the speed of a token ring backplane network is specified in this table. Each entry in the chassis segment subtype table 845 contains subfields for chassis segment subtype index, chassis segment subtype flavor, chassis segment subtype speed and chassis segment subtype entry status. The chassis segment subtype index is a unique index for the entry. The index field is used by the management agent to traverse the table in order of chassis segment subtype index, and to find an entry corresponding to a specific index. The chassis segment subtype flavor indicates the specific media type of a backplane network. The chassis segment subtype speed indicates the speed of the segment expressed in hundreds of bits per second. The chassis segment subtype entry status is the status of the table entry.

The chassis port table 850 is a list of backplane ports on line cards attached to the networking hub. The hub management agent 830 initializes this table based on the contents of the Internal Common (ICom) tables 870 in the line cards. Each entry in the chassis port table 850 includes chassis port index, chassis port slot, chassis port name, chassis port type, chassis port subtype mask, chassis port subtype selected, and chassis port operation status subfields. The chassis port index is a unique index for the entry. The index field is used by the management agent to traverse the table in order of chassis segment index, and to find an entry corresponding to a specific index. The chassis port slot is the slot ID of a specific line card. A slot ID is an identifier that is unique to the hub, indicating a specific port within the backplane of the hub. If a line card has more than one backplane port, the same slot ID may appear multiple times in this table. The chassis port name is an administratively assigned path name. The chassis port type is the port's media type. The media type of a port is determined by the type of networking device which is attached to the port. For example, the media type of a port having a line card connected to an FDDI network would be equal to the type of fiber optic cable attached to the line card. The media type of a port having a line card connected with an Ethernet network would be equal to the physical media of the Ethernet network, for example twisted pair or coaxial cable.

The chassis port subtype selected is the index of an entry in the chassis port subtype table that corresponds with the port for the entry. The chassis port operation status is the operational status of the port for the entry. Example operational status values correspond with statuses of CONNECTED (value=0), DISABLED (value=1), CONNECTION-PENDING (value=2), and DISCONNECTION-PENDING (value=3).

The chassis port subtype table 855 is a table containing additional information about a port. In an example embodiment, the speed of a token ring port is specified in this table. Each entry in the chassis port subtype table 855 contains chassis port subtype index, chassis port subtype port index, chassis port subtype flavor and chassis port subtype speed subfields. The chassis port subtype index is a unique index into the table for each entry. The index field is used by the management agent to traverse the table in order of chassis port subtype index, and to find an entry corresponding to a specific index. The chassis port subtype index is the index of a port in the chassis port table that can support the specified chassis port subtype flavor and chassis port subtype speed. The chassis port subtype flavor is the specific media type a port is selected to support. The chassis port subtype speed is the transmission speed of the port expressed in hundreds of bits per second.

The chassis port description table 860 is a list of backplane port descriptions for line cards attached to the networking hub. The hub management agent 830 fills in the table based on the contents of the Internal Common tables in the line cards, for example Internal Common tables 870 in the line card 800. The entries for this table have index and descriptor subfields. The index is a unique index for the entry. The index subfield is used by the management agent to traverse the able in order of index subfield values, and to find an entry corresponding to a specific index. The descriptor is text describing the line card backplane port for the line card corresponding to the entry.

The chassis connection table 865 is a list of logical connections between line cards and backplane networks. During operation, the management agent initializes this table based on a default configuration. The hub management agent 830 is responsible for accessing this table on behalf of the NMS 805. When the NMS 805 requests the hub management agent 830 to create an entry in the chassis connection table 865, the hub management agent 830 creates an entry in the chassis connection table 865, and also sets the interface status of a corresponding port to 'connected' in the Internal Common backplane connection table IcomBpConnTable 875 within the line card to be connected to the backplane network, for example, line card 800.

The chassis connection table 865 contains chassis connection index, chassis connection segment, and chassis connection port subfields. The chassis connection index is a unique index into the table. The chassis connection index is used by the management agent to traverse the table in order of chassis connection index, and to find an entry corresponding to a specific index. The chassis connection segment is an index into the chassis segment table for the corresponding backplane segment. The chassis connection port is an index into the chassis port table for the corresponding backplane network.

Further shown in the line card 800 of FIG. 5 are line card bus 880, microprocessor 882 coupled with the line card bus 880, and memory 884 coupled with the line card bus 880. A line card management process 886 is shown for purposes of example as a software process executing on microprocessor 882. Also shown in FIG. 5 are the Internal Common ("ICom") tables 870 within the memory 884. The ICom tables 870 are shown to include IComBpIfTable 888, IComBpIfSubtypeTable 890, IComBpPortDescriptionTable 892, IComBpSignalSetTable 894, and IComBpConnTable 875.

The IComBpIfTable 888 is a list of backplane interfaces on a line card. One entry exists for each backplane interface on the line card. The hub management agent 830 retrieves this table from the line card 800 when either the line card 800 or the hub management agent 830 is initialized. Each entry in IComBpIfTable includes IComBpIfIndex, IComBpIfPortId, IComBpIfType, IComBpIfsubtypeselect and IComBpIfOperStatus subfields. The IComBpIfIndex is a unique value for each interface. The value of this object ranges between 1 and n where n is the total number of backplane interfaces supported by the device. The IComBpIfPortId is a backplane port ID value. ID values are unique within each line card. Since a port may have multiple interfaces, a port ID can appear multiple times in this table. The IComBpIfType is a port's media type, for example Ethernet or FDDI. The IComBpIfSubtypeSelect is the index (IComSubtypeIndex) into the IComBpIfSubtypeTable which describes the specific media type a port interface is selected to support. The value of this subfield ranges between 0 and n where n is the total number of backplane subtypes described by the IComBpSubtypeTable. A value of 0 indicates that no subtype has been selected. The IComBpIfOperStatus is the operational status of an interface. In an example embodiment, the value of this subfield is either unconfigured (value of 2), or broken (value of 1) upon initialization. It becomes configured (value of 3) or testing (value of 4), broken (value of 1) or connected (value of 5) as a result of the IComBpConnTable IComBpConnAdminStatus being set to either configured (value of 3) or connected (value of 4).

The IComBpIfSubtypeTable 890 is a list of backplane interface subtypes supported by the line card 800. The entries in this table include IComBpIfSubtypeIndex, IfSubtypeIfIndex, IComBpIfSubtypeFlavor and IComIfSubtypeSpeed subfields. The IComBpIfSubtypeIndex is a unique value for each subtype supported by a backplane interface. The value of this subfield ranges between 1 and n, where n is the total number of backplane subtypes supported by a backplane interface. The IfSubtypeIfIndex is an index into the IComBpIfTable corresponding to the IComBpIfIndex. This indexes entries in the IComBpIfSubtypeFlavor and IComBpIfSubtypeSpeed structures. The IComBpIfSubtypeFlavor is the specific media type a port interface supports, for example thin wire Ethernet or FDDI. The IComIfSubtypeSpeed is the speed at which a port interface supports transmission and receiving of data, expressed in thousands of bits per second.

The IComBpPortDescriptionTable 892 is a list of descriptions of the backplane ports on a line card. Each entry contains a description of a backplane port. Each entry includes an index subfield containing the ID of the port being described. This value is the same as that in IComBpIfPortId for the interfaces that implement the port. Each entry further includes a description subfield containing a text description of the backplane port.

The IComBpSignalSetTable 894 is a list of backplane port signal sets, and allows the line card 800 to advertise the backplane signals to which it can connect. Each signal set is a combination of data, control, and clock signals (etches) accessible to the line card 800. The line card 800 advertises the backplane signals to which it can connect, and the hub management agent 830 retrieves this table from the line card 830 when either the line card 800 or the hub management agent 830 is initialized. Each entry in the table includes IComSignalSetIndex, IComSignalSet, and IComBpSignalSetIfIndexMask subfields. The IComSignalSetIndex is a unique value for each backplane signal set. The value of this object ranges between 1 and n, where n is the total number of backplane signal set definitions. The IComSignalSet specifies the backplane data signals to which a module can connect. In the example embodiment where the shared data path resources in the networking hub are terminated etch lines, the signal set code contains as many bits as there are terminated etch lines, and those bits that are set in the signal set code correspond to terminated etch lines that are accessible to the line card 800. The IComBpSignalSetIfIndex-Mask specifies the backplane interfaces for which the signal set applies. It is a bit map of IComBpIfTable indices with bit 0 corresponding to IComBpIfIndex 1. Bits set to 1 indicate the port interface which can access the signal set contained in the corresponding IComBpIfIndex table entry.

The IComBpConnTable 875 is used by the hub management agent 830 and the NMS 805 to create and remove backplane connections. This table is a list of backplane connections of the line card 800. Each line card, for example line card 800, has an icomBpConnTable 875 containing at least one entry for each backplane interface. The hub management agent 830 retrieves this table from the line card 800 when either the line card 800 or the hub management agent 830 is initialized. The creation of an entry in this table, as a result of a SET command to the chassisConnTable by NMS 805 being detected by the hub management agent 830, creates a connection to a backplane network. For ring type backplane networks, a connection is reflected by changes in two IComBpConnTable entries which must be written atomically. Each entry in this table contains IComBpConnIndex, IComBpConnIf, IComBpConnSignalSet, IComBpConnOperStatus, IComBpConnAdminStatus and IComBpConnEntryStatus subfields. The IComBpConnIndex is a unique value for each backplane connection. The value of this subfield ranges between 1 and n, where n is the total number of backplane connections. The IComBpConnIf subfield specifies the index of the interface described in the IComBpIfTable for which the connection applies. Together with IComBpConnSignalSet, this defines a backplane connection. The IComBpConnSignalSet specifies the index of the signal set described in the icomBpSignalSetTable for which the connection applies. Together with IComBpConnIf, this defines a backplane connection. The IComBpConnOperStatus is the operational status of the connection. The IComBpConnAdminStatus is the desired status of the connection. The IComBpConnEntryStatus is the status of the table entry.

Figure 6:
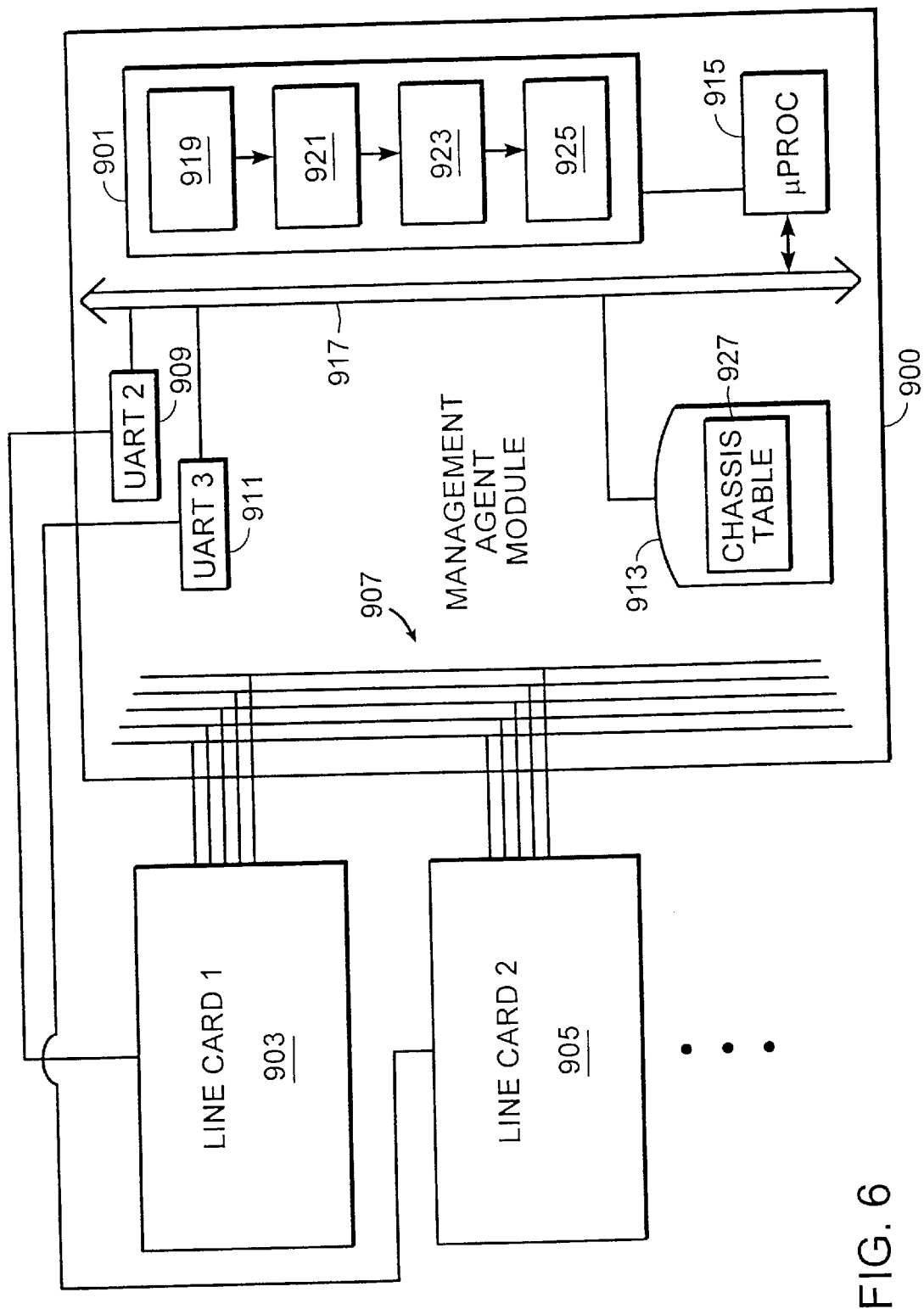
FIG. 6 shows an example embodiment of the networking hub.

FIG. 6 is a diagram of an example embodiment of a networking hub 900, particularly pointing out an example design of a management agent 901. In FIG. 6 there is shown a Line Card 1 903, a Line Card 2 905, and the networking hub 900. The example embodiment of FIG. 6 shows the networking hub 900 including shared data path resources 907 coupled with the Line Card 1 903 and the Line Card 2 905. Further, UART2 909, UART3 911, memory 913 and microprocessor 915 are all shown coupled with a networking hub bus 917. Note that the embodiment of FIG. 6 does not include a separate management agent module, in the example embodiment of FIG. 6, the elements other than those elements contained in the line cards themselves are contained in the networking hub 900 itself. The management agent 901 is shown as a software process running on the microprocessor 915. The detailed operations of the management agent 901 are shown as subprocesses 919, 921, 923, and 925 in the management agent 901.

During operation of the elements shown in FIG. 6, the management agent 901 first executes subprocess 919. In subprocess 919, the management agent 901 determines the internal networking capabilities of each line card. For example, the internal network type code of each line card is obtained, indicating the internal networking capabilities for that line card.

Next, in subprocess 921, the management agent 901 determines the accessibility of hub data path resources to each line card. For example, a signal set code is obtained from each line card using a request/response protocol. In subprocess 923, following completion of subprocess 921, the hub management agent 901 determines a subset of data path resources accessible to a set of line cards having a common internal networking capability, for example, Ethernet. Following completion of subprocess 923, in subprocess 925 the management agent 901 creates a backplane network over the subset of data path resources determined by subprocess 923.

Figure 7:
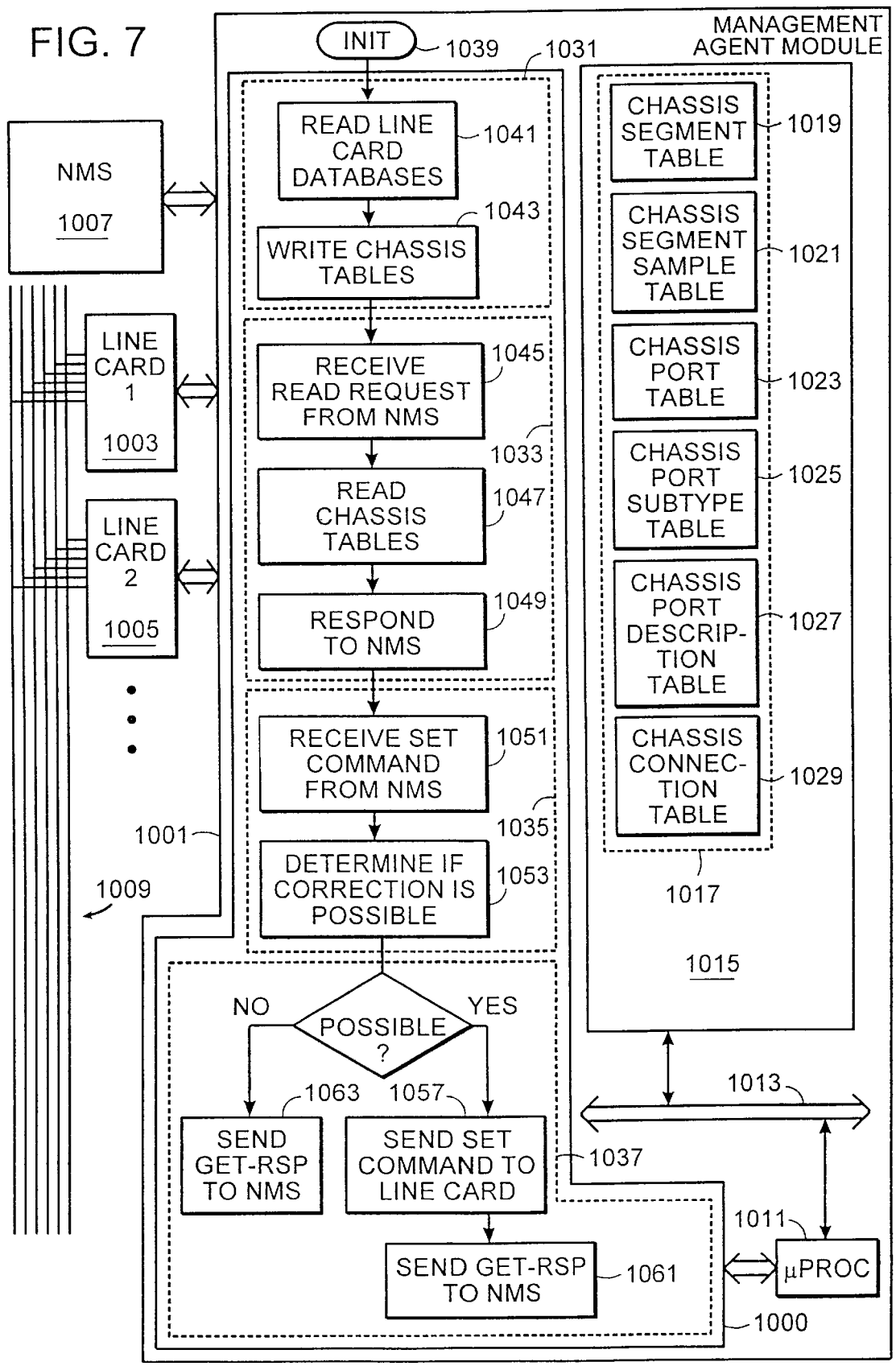
FIG. 7 shows a networking hub and an example design of the hub management agent.

FIG. 7 is a design diagram showing an example embodiment of a networking hub, and further showing the detailed design of an example embodiment of a management agent 1000 for the networking hub. A management agent module 1001 is shown coupled with a Line Card 1 1003, a Line Card 2 1005, and a Network Management Station (NMS) 1007. Line Card 1 1003 and Line Card 2 1005 are coupled with data path resources 1009. The management agent module 1001 is shown including a management agent 1000, shown for purposes of example as a software process executing on a microprocessor 1011. The microprocessor 1011 is coupled with a management agent bus 1013. The management agent bus 1013 is further coupled with a memory 1015. The memory 1015 is shown containing chassis tables 1017, including the chassis segment table 1019, the chassis segment subtype table 1021, the chassis port table 1023, the chassis port subtype table 1025, the chassis port description table 1027, and the chassis connection table 1029.

During operation of the elements shown in FIG. 7, the subprocesses performed within the hub management agent 1000 are shown by steps 1031, 1033, 1035 and 1037, and the substeps therein contained. In the example embodiment of FIG. 7, the hub management agent 1000 is responsive to commands received from the NMS 1007. Following an initialization 1039 of the management agent module 1001 or one of line cards 1003 or 1005, in step 1031, the hub management agent 1000 determines the capabilities and characteristics of the line cards 1003 and 1005. Specifically within step 1031, in substep 1041 the hub management agent 1000 reads the Internal Common (ICom) line card databases. Following substep 1041, in substep 1043, the management agent 1000 writes the chassis tables 1017 based on the information read from the line cards 1003 and 1005 in substep 1041.

Next, in step 1033, the management agent 1000 reports the results of step 1031 to the NMS 1007. Specifically, in substep 1045, the management agent 1000 receives a "get-next" (GET-NEXT) message from NMS 1007. Subsequently, the management agent 1000 reads the chassis tables 1017 in substep 1047, and then in substep 1049 responds to the NMS 1007 by transmitting a "get response" (GET-RESPONSE) message to the NMS 1007, reflecting the contents of the chassis tables 1017.

Following step 1033, in step 1035 the hub management agent 1000 responds to a connection request received from the NMS 1007. Specifically, in substep 1051, the management agent 1000 receives a SET message from the NMS 1007, then in substep 1053 the management agent 1000 determines whether the connection requested by the received SET message is possible.

In step 1037, following step 1035, the management agent 1000 either establishes the connection requested by the SET command received from the NMS 1007, or sends a message back to the NMS 1007 reporting that the connection request could not be satisfied. Specifically, if the management agent 1000 determined in substep 1053 that the requested connection could be made without disturbing the existing connections between line cards attached to the hub, then in substep 1057 the management agent 1000 sends one or more SET commands to the line card(s) that are to be connected. The SET commands sent by the management agent 1000 to the line cards (for example 1003 and 1005) in substep 1057 indicate which signal sets comprise the backplane networks the line cards are to connect to. Following substep 1057, the management agent 1000 sends a "get-response" (GET-RESPONSE) message to the NMS 1007, indicating that the requested connection was successfully established in substep 1061. If the management agent 1000 determines in substep 1053 that the connection request cannot be satisfied, then in step 1063 the management agent 1000 sends a GET-RESPONSE message to the NMS 1007 indicating that the connection request could not be completed.

Figure 8:
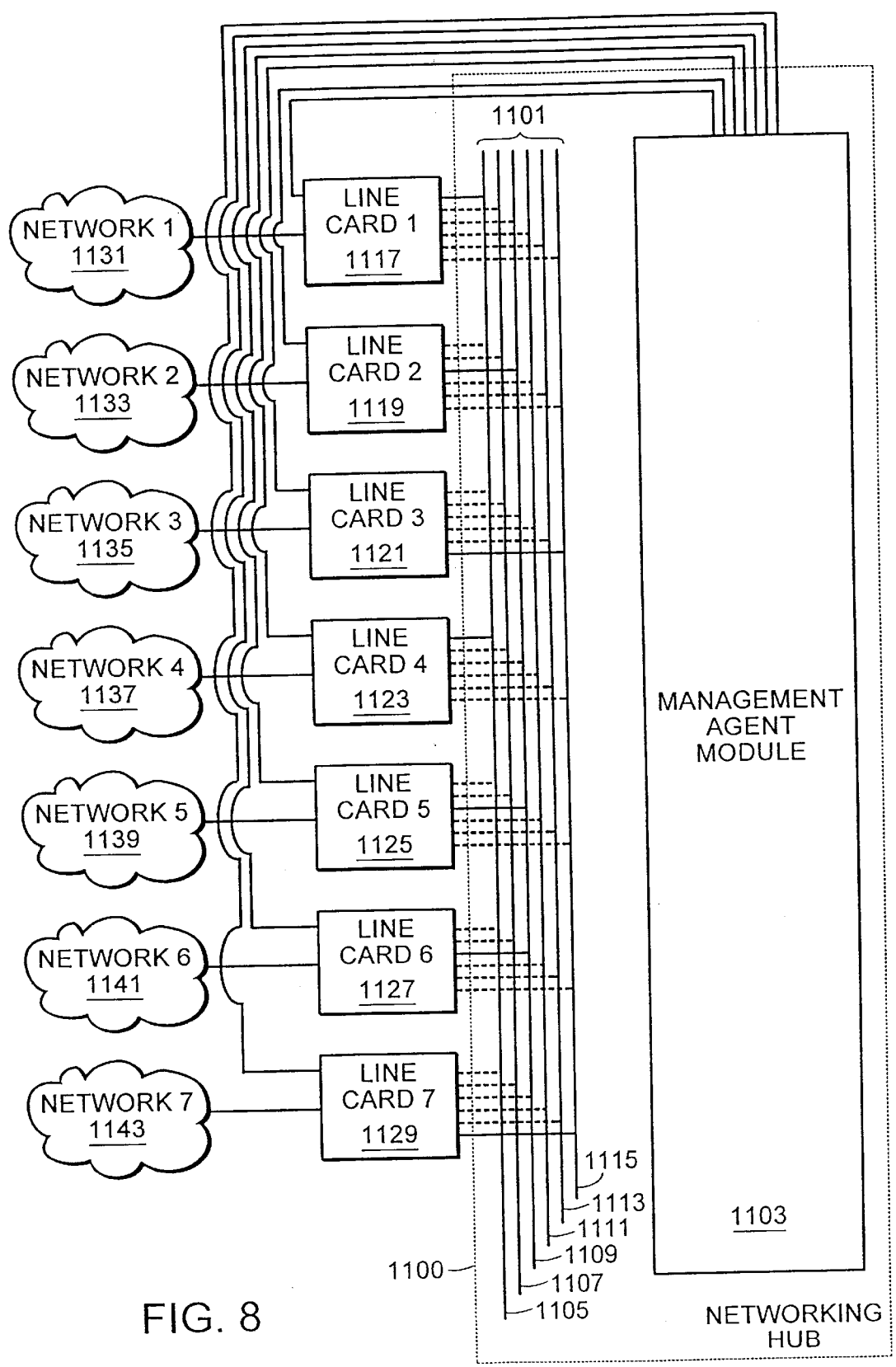
FIG. 8 shows multiple backplane segments created by an example embodiment of a networking hub on data path resources within the hub.

FIG. 8 is a design diagram showing multiple backplane segments created by the networking hub on data path resources within the hub. A networking hub 1100 is shown having data path resources 1101 and a management agent module 1103. The data path resources 1101 consist of terminated etch lines 1105, 1107, 1109, 1111, 1113, and 1115.

The management agent module 1103 is coupled with Line Card 1 1117, Line Card 2 1119, Line Card 3 1121, Line Card 4 1123, Line Card 5 1125, Line Card 6 1127 and Line Card 7 1129. The management agent module 1103 is coupled with the line cards 1117, 1119, 1121, 1123, 1125, 1127, and 1129 through individual UARTs within the management agent module associated with each one of the line cards. Each of the line cards is coupled with an external network. Specifically, Line Card 1 1117 is coupled with Network 1 1131, Line Card 2 1119 is coupled with Network 2 1133, Line Card 3 1121 is coupled with Network 3 1135, Line Card 4 1123 is coupled with Network 4 1137, Line Card 5 1125 is coupled with Network 5 1139, Line Card 6 1127 is coupled with Network 6 1141, and Line Card 7 1129 is coupled with Network 7 1143.

Networks 1 through 7 (1131, 1133, 1135, 1137, 1139, 1141, 1143) are of multiple types, for example Ethernet, FDDI, and Token Ring. Network 4 1137 and Network 1 1131 are of a first network type, for example Ethernet. Network 2 1133, Network 5 1139 and Network 6 1141 are of a second network type, for example FDDI. And Network 3 1135 and Network 7 1143 are of a third network type, for example Token Ring.

During operation of the elements shown in FIG. 8, a management agent in the management agent module 1103 determines the internal networking capabilities of each line card. In the example embodiment, each line card has internal networking capabilities equivalent to its internal network type. Next, the hub management agent determines the accessibility of the data path resources 1101 to each of the line cards. For purposes of example, all of the line cards 1117, 1119, 1121, 1123, 1125, 1127 and 1129 are coupled with each one of terminated etch lines 1105, 1107, 1109, 1111, 1113 and 1115. This coupling is shown by dotted lines connecting the terminated etch lines 1105, 1107, 1109, 1111, 1113 and 1115 and the line cards 1117, 1119, 1121, 1123, 1125, 1127 and 1129.

The management agent then determines which of the line cards have the same internal network type, and also which of the line cards can access a common one of the terminated etch lines 1105, 1107, 1109, 1111, 1113 and 1115. In this example, the management agent determines that Line Card 4 1123 and Line Card 1 1117 have an external network equal to Ethernet, and can both access each of the terminated etch lines 1105, 1107, 1109, 1111, 1113 and 1115. The management agent also determines that Line Card 2 1119, Line Card 5 1125 and Line Card 6 1127 have an interanl network type of FDDI. And the management agent further determines that Line Card 3 1121 and Line Card 7 1129 have an internal network type equal to Token Ring.

The management agent next creates backplane networks on the data path resources 1101. The solid lines connecting the line cards to specific terminated etch lines indicate the logical connections of line cards to backplane networks created by the management agent. The solid lines thus show that the hub management agent caused each specific line card to form a backplane network over the terminated etch line to which a solid line extends from that line card.

Continuing with reference to the example embodiment of FIG. 8, the management agent establishes a first backplane network between Line Card 4 1123 and Line Card 1 1117 along terminated etch line 1105. The first backplane network is of type Ethernet. The management agent also establishes a second backplane network, along terminated etch line 1109, between Line Card 2 1119, Line Card 5 1125 and Line Card 6 1127 of type FDDI. The hub management agent further establishes a third backplane network, on terminated etch line 1115, between Line Card 3 1121 and Line Card 7 1129 of type Token Ring. Subsequent to establishment of the backplane networks, the line cards within each backplane network transmit and receive data among themselves.

Figure 9:
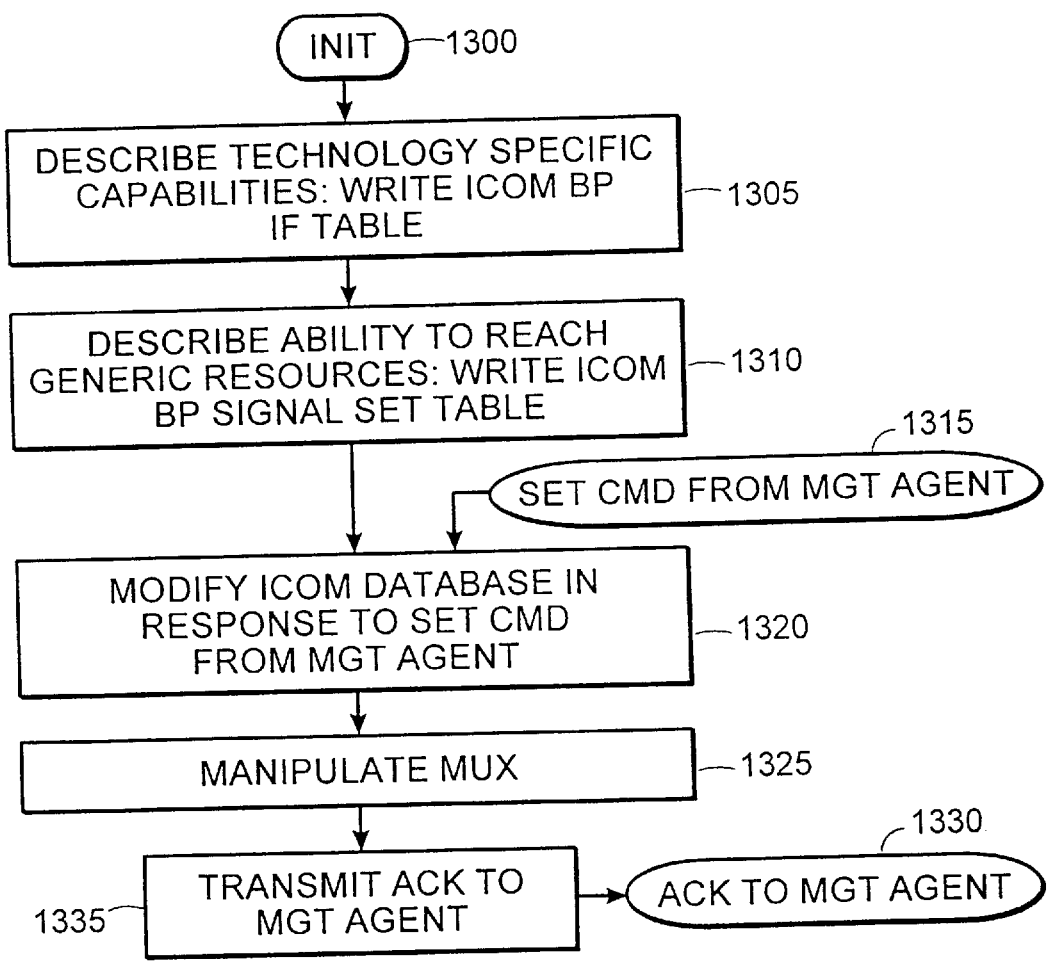
FIG. 9 is a flow chart showing steps performed by an example embodiment of a line card attached to the networking hub.

FIG. 9 is a flow chart showing steps performed by a line card attached to the networking hub. During operation of a line card attached to a networking hub, the steps shown in FIG. 9 are performed. Upon initialization 1300 of the line card, for example during power up, the line card describes its internal networking capabilities and the accessibility of shared data path resources to the line card. In an example embodiment, during step 1305 the line card management process writes information describing internal networking capabilities of the line card to the ICOM tables in the line card memory with codes or values indicating what type of internal network the line card supports.

In step 1310, the line card describes its ability to reach shared hub data path resources. In an example embodiment, the line card management process writes information to the ICom tables in the line card memory with codes or values indicating the subset of data path resources that are accessible to the line card.

Subsequent to steps 1305 and 1310, the management agent reads the ICOM table in the line card to determine the accessibility of shared data path resources to the line card and internal networking capabilities of the line card. In a first example embodiment, the hub management agent performs reads of the ICOM tables within the line card through a request/response protocol, in which the management agent first sends a GET-NEXT message to the line card requesting certain information, and the line card management process responds by sending a GET-NEXT message with a GET-RESPONSE message containing the requested information.

Following step 1310, the line card receives a SET command 1315 from the management agent. The SET command indicates to the line card that certain values or codes are to be written to the ICOM tables in the line card memory. In an example embodiment where the management agent can directly write to line card memory, then the codes or values are written directly to the line card memory by the management agent.

After receiving the SET command, in step 1320, the line card modifies the ICOM tables in the line card memory as indicated by the SET command. In an example embodiment, the SET command indicates to the line card management process to write values into a set of tables within the ICOM tables of the line card. The values written to the set of tables then indicate a set of data path resources on which the line card is to become part of a backplane network, and the type and speed of that network.

Next, in step 1325, the line card management process responds to the new values or codes in the ICOM tables resulting from the SET command 1315 by manipulating the select circuit in the line card, to bidirectionally connect a subset of the hub data path resources with networking circuitry within the line card. In a first example embodiment, the line card management process periodically polls the values in the ICOM tables to determined whether there has been a modification. In an alternative example embodiment, the line card management process is notified by interrupt of the line card microprocessor whenever the values in the ICOM tables are modified. The line card thereafter uses its internal networking circuitry to operate on a backplane network over the subset of hub data path resources.

In step 1335, the line card management process transmits acknowledgement ACK 1330 to the hub management agent, indicating that the line card has successfully connected with the backplane network.

Figure 10:
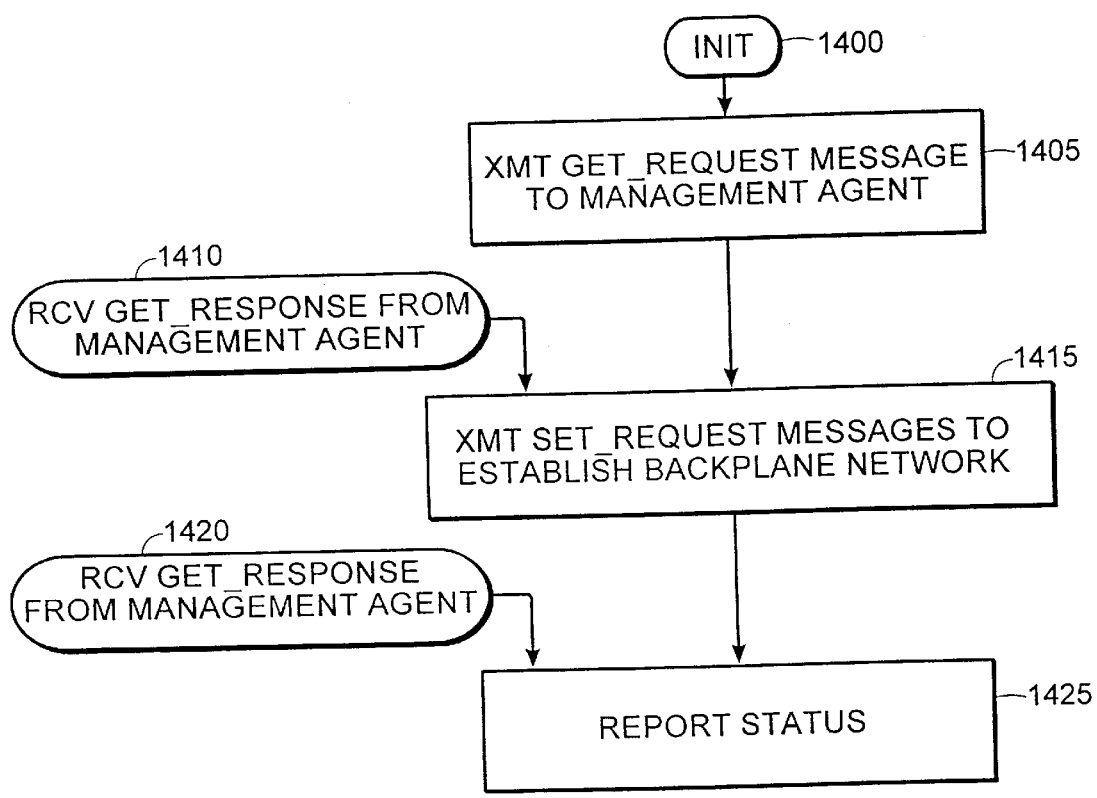
FIG. 10 is a flow chart showing steps performed by an example embodiment of a remote network management station to configure backplane networks within a networking hub in conjunction with the hub management agent.

FIG. 10 is a flow chart showing steps performed by an example embodiment of a remote Network Management Station (NMS) to configure backplane networks within the networking hub in conjunction with the hub management agent. Upon initialization condition 1400, for example initialization of the networking hub, or receipt of a connection request from a network management user or application, the NMS performs step 1405. In step 1405 the NMS transmits one or more GET-NEXT-REQUEST message to the management agent of the networking hub. In the example embodiment of FIG. 10, the format of the GET-NEXT-REQUEST messages transmitted to the management agent of the networking hub is defined by the Simple Network Management Protocol (SNMP). The GET-NEXT-REQUEST messages cause the hub management agent to return the contents of CHASSIS tables within the hub management agent module memory. The contents of the CHASSIS tables indicates the hub internal networking capabilities, and accessibility to data path resources, of each line card attached to the networking hub.

Following step 1405, in step 1410 the NMS receives one or more GET-RESPONSE messages transmitted by the management agent of the networking hub. The format of the GET-NEXT-RESPONSE message is defined by the Simple Network Management Protocol (SNMP). The GET-RESPONSE messages include the contents of the CHASSIS tables stored in the hub management agent module memory. In response to receipt of the GET-NEXT-RESPONSE message 1410, the NMS transmits a SET-REQUEST message to the networking hub in step 1415. The format of the SET-REQUEST message is also defined by SNMP. The SET-REQUEST message causes the hub management agent to modify the values of entries within the CHASSIS tables stored in the hub management agent module memory. The SET-REQUEST message indicates which values in the CHASSIS tables in the management agent module memory are to be modified, and the new values to be written. The management agent then responds by modifying the indicated CHASSIS table values, and also modifying any ICom table values in the line cards that must be changed to create the physical layer of the new backplane network. The hub management agent transmits GET-RESPONSE message 1420 to the NMS, when the modifications to the CHASSIS and ICOM tables are completed. The format of the GET-RESPONSE message is defined by SNMP.

Upon receipt of the GET-RESPONSE message 1420 from the hub management agent, in step 1425 the NMS reports the status of the connection request to the process or application which originally requested the connection be made. If the connection was made as a result of a default configuration at initialization, the status of the connection is kept in a data base for future reference and reporting by network management processes.

Figure 11:
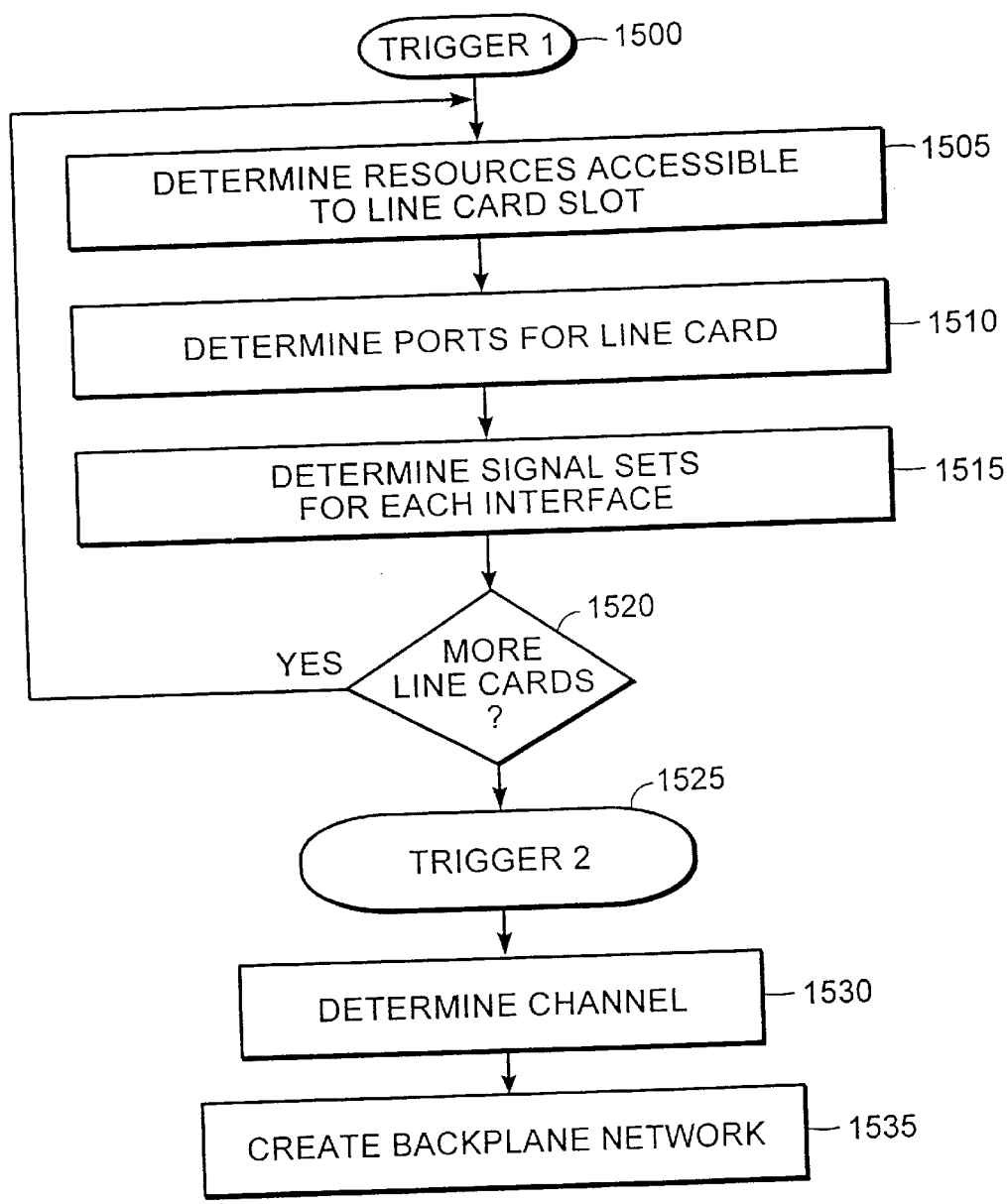
FIG. 11 is a flow chart showing the steps of an example embodiment of a method for connecting line cards to data path resources in a networking hub.

FIG. 11 is a flow chart showing the steps of a method for connecting line cards to data path resources in a networking hub. A first trigger event 1500 is shown initiating the steps of FIG. 11. An example of first trigger event 1500 is the initial power up of the networking hub. Following first trigger event 1500, in step 1505, the management agent within the networking hub determines the shared data path resources accessible to a first line card based on the slot number the first line card is installed in.

Following step 1505, in step 1510, and taking into consideration those data path resources determined in step 1505, the management agent determines the ports for the first line card. During step 1510 the management agent determines the internal networking capability of the first line card. Further in step 1510, the management agent determines the interfaces through which the first line card can access the shared data path resources. Following step 1510, in step 1515, the management agent determines the signal sets for each of the interfaces of the first line card determined in step 1510.

In step 1520, the management agent determines if steps 1505, 1510, and 1515 have been repeated for all line cards installed in the networking hub. Steps 1505, 1510, and 1515 are then repeated as necessary for any remaining line cards installed in the networking hub.

In step 1525, a second trigger event occurs. An example of second trigger event 1525 is receipt of a connection request issued by an NMS. Following second trigger event 1530, the management agent determines a channel for the requested connection. In step 1535, the management agent creates a backplane network using the channel determined in step 1530.

While the invention has been described with reference to several example embodiments, the description is not meant to be construed in a limiting sense. Various modifications of the disclosed embodiment, as well as other embodiments of the invention, will be apparent to person skilled in the art upon reference to this description. It is therefore contemplated that the appended claims will cover any such modifications or embodiments which fall within the true scope of the invention.

We claim:

1. A method for passing data among line cards attached to a networking hub, comprising the steps of:

A. determining the accessibility of data path resources within said networking hub to each one of said line cards, said determining said accessibility including obtaining a signal set code from one of said line cards, said signal set code representing the accessibility of said data path resources to said one of said line cards, said determining said accessibility further including writing said signal set code into a memory;

B. determining the internal networking capability of each one of said line cards;

C. determining a subset of said data path resources, said subset of said data path resources accessible to a set of two or more of said line cards, said set of two or more line cards having compatible internal networking capabilities; and D. creating a backplane network connecting said two or more of said line cards, responsive to said step of determining said subset of said data path resources, said backplane network having a transmission medium including said subset of data path resources, said set of two or more line cards subsequently exchanging data over said backplane network.

2. The method of claim 1, further comprising:

receiving a first command from a network management station; and wherein said step of determining a subset of said data path resources is responsive to said first command received from said network management station.

3. The method of claim 2, further comprising:

receiving a second command from said network management station; and wherein said step of creating a backplane network is responsive to said second command received from said network management station.

4. The method of claim 3, wherein said set of two or more of said line cards includes one or more line cards indicated in said first command received from said network management station.

5. The method of claim 1 wherein said internal networking capability of each one of said line cards is equal to the network type of an external network coupled with said each one of said line cards.

6. A method for using data path resources in a networking hub to pass data among line cards attached to the networking hub, each of said line cards having an internal networking capability equal to a network type of an external network coupled with said each one of said line cards, said internal networking capability represented by an internal network type code, each of said line cards further including a signal set code representing the accessibility of said data path resources to said line card, comprising the steps of:

A. determining the accessibility of said data path resources to each one of said line cards by obtaining said signal set code from each one of said line cards and writing said signal set code into a memory within said hub;

B. determining the internal networking capability of each one of said line cards by obtaining an internal network type code from each one of said line cards and writing said internal network type code into a memory within said hub;

C. receiving a first command from a network management station, said first command indicating a set of two or more of said line cards to be connected;

D. determining a subset of said data path resources, responsive to said first command received from said network management station, said subset of said data path resources accessible to said set of two or more of said line cards, said set of two or more line cards having compatible internal networking capabilities;

E. receiving a second command from said network management station; and

F. creating a backplane network, responsive to said second command received from said network management station, and further responsive to said step of determining said subset of said data path resources, said backplane network having a transmission medium including said subset of data path resources, whereby said set of two or more line cards subsequently exchange data over said backplane network.

7. An apparatus for passing data among line cards attached to a networking hub, comprising:

A. a management agent, coupled with said networking hub;

B. data path resources within said networking hub, coupled with said line cards;

C. means, within said management agent, for determining the accessibility of said data path resources to each one of said line cards, said means for determining said accessibility obtaining a signal set code from one of said line cards, said signal set code representing the accessibility of said data path resources to said one of said line cards, said means for determining said accessibility further writing said signal set code into a memory;

D. means, within said management agent, for determining the internal networking capability of each one of said line cards;

E. means, within said management agent, for determining a subset of said data path resources, said subset of said data path resources accessible to a set of two or more of said line cards, said set of two or more line cards having compatible internal networking capabilities; and F. means, within said management agent, for creating a backplane network, responsive to said step of determining said subset of said data path resources, said backplane network having a transmission medium including said subset of data path resources, whereby said set of two or more line cards subsequently exchange data over said backplane network.

8. The apparatus as in claim 7, wherein each said line card further comprises:

a line card management process;

a networking logic implementing a networking protocol;

a select logic, coupled with said data path resources and said networking logic, and responsive to said line card management process, for connecting said networking logic with said data path resources; and means, within said line card management process, and responsive to said means for creating a backplane network, for controlling said select logic such that said networking logic is connected with said subset of said data path resources.

9. The apparatus as in claim 8, wherein each said line card further comprises:

one or more Internal Common tables within said memory, said Internal Common tables containing entries representing the internal networking capability of said line card; and means, within said line card management process, and responsive to said means for determining the accessibility of said data path resources to each one of said line cards, for sending said signal set code to said management agent.

10. The apparatus as in claim 9, wherein each said line card further comprises:

means, within said line card management process, and responsive to said means for determining the internal networking capability of each one of said line cards, for sending the contents of a predetermined set of said Internal Common tables to said management agent.

11. The apparatus as in claim 10, wherein each said line card further comprises:

a connection table, within said Internal Common tables;

means, within said line card management process, and responsive to said means for creating a backplane network, for modifying the contents of said connection table; and means, within said means for controlling said select logic such that said networking logic is connected with said subset of said data path resources, for controlling said select logic in response to said contents of said connection table.

12. The apparatus as in claim 7, wherein said management agent is contained within said networking hub.

13. The apparatus as in claim 7, wherein said management agent is contained within a management agent module attached to said networking hub.

14. An apparatus for passing data among line cards attached to a networking hub, comprising:

A. a management agent, coupled with said networking hub;

B. data path resources within said networking hub, coupled with said line cards;

C. means, within said management agent, for determining the accessibility of said data path resources to each one of said line cards;

D. means, within said management agent, for determining the internal networking capability of each one of said line cards;

E. means, within said management agent, for determining a subset of said data path resources, said subset of said data path resources accessible to a set of two or more of said line cards, said set of two or more line cards having compatible internal networking capabilities;

F. means, within said management agent, for creating a backplane network, responsive to said step of determining said subset of said data path resources, said backplane network having a transmission medium including said subset of data path resources, whereby said set of two or more line cards subsequently exchange data over said backplane network; and G. each said line card including
a line card management process,
a networking logic implementing a networking protocol,
a select logic, coupled with said data path resources and said networking logic, and responsive to said line card management process, for connecting said networking logic with said data path resources,
means, within said line card management process, and responsive to said means for creating a backplane network, for controlling said select logic such that said networking logic is connected with said subset of said data path resources,
a memory,
one or more Internal Common tables within said memory, said Internal Common tables containing entries representing the internal networking capability of said line card,
a signal set code, stored within said memory, said signal set code representing which of said data path resources are accessible to said line card, and
means, within said line card management process, and responsive to said means for determining the accessibility of said data path resources to each one of said line cards, for sending said signal set code to said management agent.

15. A method for passing data among line cards attached to a networking hub, comprising the steps of:

A. determining the accessibility of data path resources within said networking hub to each one of said line cards;

B. determining the internal networking capability of each one of said line cards;

C. determining a subset of said data path resources, said subset of said data path resources accessible to a set of two or more of said line cards, said set of two or more line cards having compatible internal networking capabilities;

D. creating a backplane network connecting said two or more of said line cards, responsive to said step of determining said subset of said data path resources, said backplane network having a transmission medium including said subset of data path resources, said set of two or more line cards subsequently exchanging data over said backplane network;

E. receiving a first command from a network management station, wherein said step of determining a subset of said data path resources is responsive to said first command received from said network management station;

F. receiving a second command from said network management station, wherein said step of creating a backplane network is responsive to said second command received from said network management station; and G. wherein said step of determining the accessibility of said data path resources to each one of said line cards further includes writing a signal set code into a memory within said hub, responsive to obtaining said signal set code from one of said line cards.

16. A computer readable medium storing executable instructions of a computer program to be executed by a computer system comprising:

A. program code for determining the accessibility of data path resources within a networking hub to each of one or more line cards attached to said networking hub, said determining said accessibility including obtaining a signal set code from one of said line cards, said signal set code representing the accessibility of said data path resources to said one of said line cards, said determining said accessibility further including writing said signal set code into a memory;

B. program code for determining the internal networking capability of each one of said line cards;

C. program code for determining a subset of said data path resources, said subset of said data path resources accessible to a set of two or more of said line cards, said set of two or more line cards having compatible internal networking capabilities; and D. program code for creating a backplane network connecting said two or more of said line cards, responsive to said step of determining said subset of said data path resources, said backplane network having a transmission medium including said subset of data path resources, said set of two or more line cards subsequently exchanging data over said backplane network.

* * * * *